(12) United States Patent
Anderson

(10) Patent No.: US 9,875,563 B2
(45) Date of Patent: Jan. 23, 2018

(54) SYSTEM AND METHOD FOR CREATING CUSTOM FINGERNAIL ART

(71) Applicant: NailSnaps, Inc., Los Angeles, CA (US)

(72) Inventor: Angelique Anderson, Los Angeles, CA (US)

(73) Assignee: Nailsnaps, LLC, Los Angeles, CA (US)

( * ) Notice: Subject to any disclaimer, the term of this patent is extended or adjusted under 35 U.S.C. 154(b) by 426 days.

(21) Appl. No.: 14/626,846

(22) Filed: Feb. 19, 2015

(65) Prior Publication Data

US 2015/0235402 A1    Aug. 20, 2015

Related U.S. Application Data

(60) Provisional application No. 61/941,866, filed on Feb. 19, 2014.

(51) Int. Cl.
*G06T 15/50* (2011.01)
*G06T 11/60* (2006.01)
(Continued)

(52) U.S. Cl.
CPC .......... *G06T 11/60* (2013.01); *G06F 3/04845* (2013.01); *G06T 3/4038* (2013.01);
(Continued)

(58) Field of Classification Search
CPC ....... G06T 11/001; G06T 15/04; G06T 11/60; G06T 11/00; G06T 19/00; G06T 15/503;
(Continued)

(56) References Cited

U.S. PATENT DOCUMENTS 6,065,969 A    5/2000  Rifkin et al.
6,328,949 B1  12/2001  Tessarolo et al.
(Continued)

FOREIGN PATENT DOCUMENTS

WO    2015/127139 A1    8/2015

OTHER PUBLICATIONS

Written Opinion of the International Searching Authority issued in International Application No. PCT/US15/16707 dated Jun. 3, 2015.
(Continued)

*Primary Examiner* — Ke Xiao
*Assistant Examiner* — Andrew Shin
(74) *Attorney, Agent, or Firm* — Eric L. Sophir; Dentons US LLP

(57) ABSTRACT

Systems and methods are provided for a creating nail polish art by providing an image, providing a hand pose stencil, including image coordinates for the fingernails of the hand pose stencil, allowing the hand pose stencil to be positioned on the image, associating the image coordinates for the fingernails to portions of the image, and displaying the portions of the image that have been associated with the image coordinates on fingernail polish stickers. Such systems and methods provide a revolutionary new way to create custom nail art by printing an image onto nail polish stickers for a gorgeous, one-of-a-kind manicure that a user can self-apply with no dry-time or waiting.

34 Claims, 43 Drawing Sheets

(51) Int. Cl.
  *G06T 11/00* (2006.01)
  *G06T 3/40* (2006.01)
  *G09G 5/14* (2006.01)
  *G06F 3/0484* (2013.01)

(52) U.S. Cl.
  CPC ............ *G06T 11/00* (2013.01); *G06T 15/503* (2013.01); *G09G 5/14* (2013.01)

(58) Field of Classification Search
  CPC ....... G06T 3/4038; G06T 7/0028; G09G 5/14; G09G 2340/0407; G06F 3/0485; A45D 29/00
  USPC ....... 345/581, 582, 619, 629, 630, 632, 660, 345/672
  See application file for complete search history.

(56) References Cited

U.S. PATENT DOCUMENTS

| | | |
|---|---|---|
| 6,336,694 B1 | 1/2002 | Ishizaka |
| 6,525,724 B1 | 2/2003 | Takami |
| 6,622,064 B2 | 9/2003 | Bartholomew et al. |
| D703,379 S | 4/2014 | Hepworth |
| 9,189,186 B2 | 11/2015 | Hepworth |
| 2005/0150508 A1* | 7/2005 | Downs ................ A45D 29/001 132/73 |
| 2007/0198118 A1 | 8/2007 | Lind |
| 2012/0010321 A1 | 5/2012 | Hashimoto |
| 2012/0113171 A1* | 5/2012 | Murata .................... B41J 3/407 347/2 |
| 2012/0284594 A1 | 11/2012 | Norwood et al. |
| 2012/0287183 A1* | 11/2012 | Bitoh ..................... A45D 29/00 347/3 |
| 2014/0003665 A1* | 1/2014 | Hoshino .............. G06K 9/4652 382/103 |
| 2014/0204002 A1* | 7/2014 | Bennet ................... G06F 3/011 345/8 |
| 2015/0084866 A1* | 3/2015 | Thomas ................... G06F 3/01 345/158 |
| 2015/0113413 A1 | 4/2015 | Norwood et al. |

OTHER PUBLICATIONS

Luine Luine, https://www.luine-luine.com/about, printed May 25, 2016, pp. 1-6.
Jamberry Studio, https://www.jamberry.com/us/en/nail-wraps, printed May 25, 2016, pp. 1-5.
Appliq, https://appliq.me/design, printed May 25, 2016, pp. 1-10.
Make Me Nails App, http://www.makemenails.com/pages/make-me-app, printed May 25, 2016, pp. 1-3.
International Search Report issued in International Application No. PCT/US15/16707 dated Jun. 3, 2015.

* cited by examiner

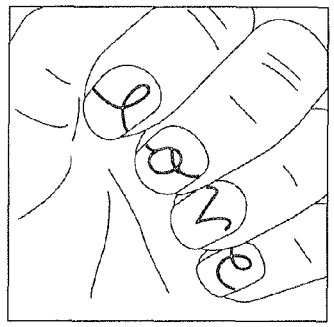
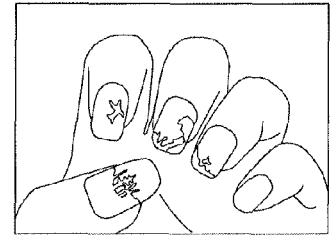
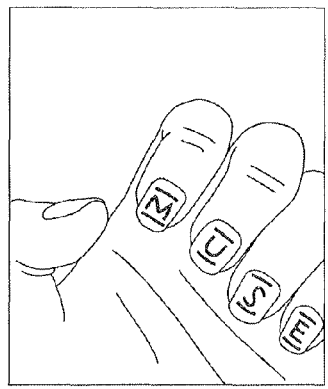
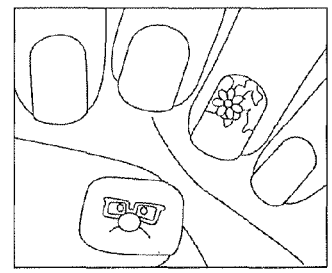
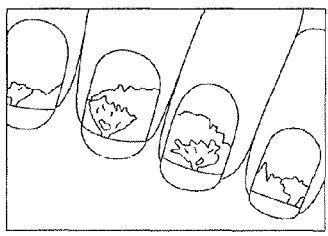
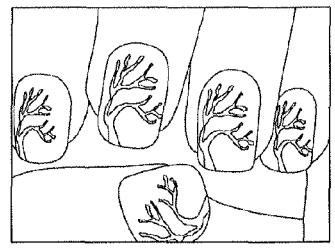
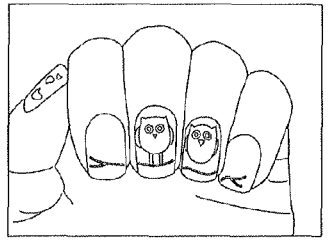
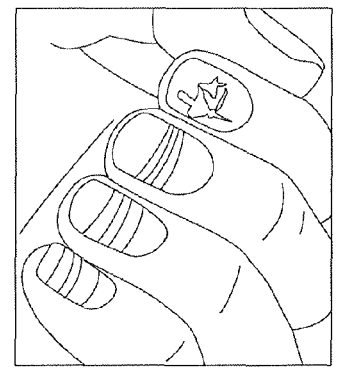
Fig. 1

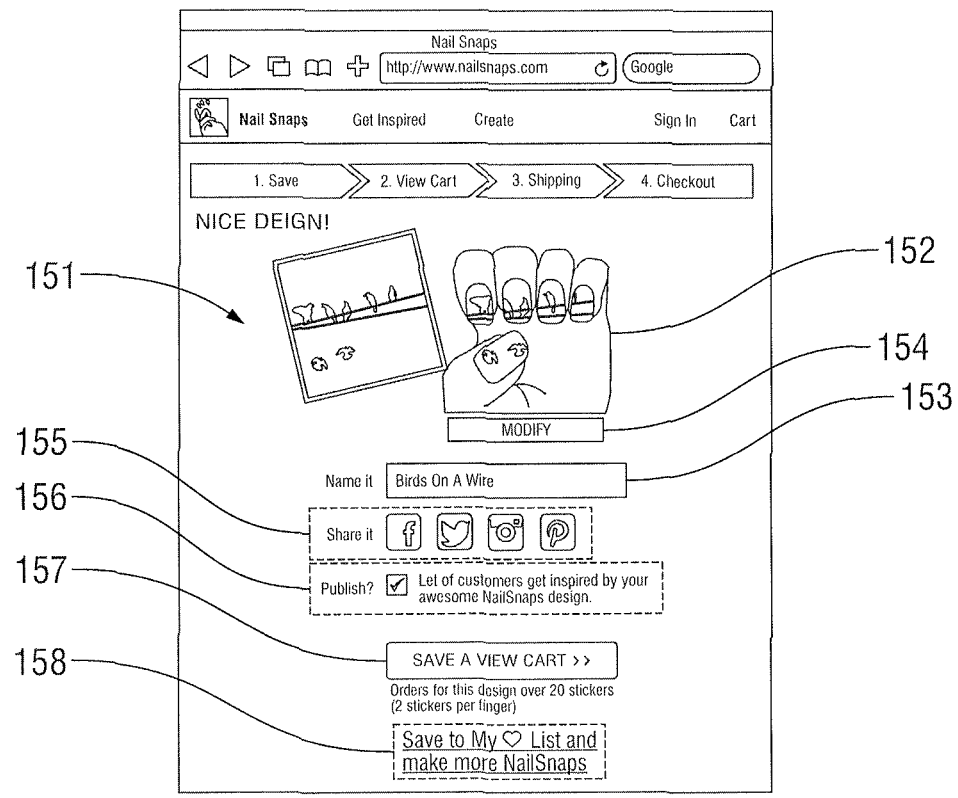
Fig. 15
Fig. 15A

ACCOUNT SETTINGS

YOUR EMAIL

Lisadmc@gmail.com

PASSWORD

Enter your password again

SAVE    Cancel

SYSTEM AND METHOD FOR CREATING CUSTOM FINGERNAIL ART

CROSS-REFERENCE TO RELATED APPLICATIONS

This application claims the benefit of U.S. Provisional Patent Application No. 61/941,866, filed Feb. 19, 2014 the entirety of which is incorporated by reference as if fully set forth herein.

FIELD OF THE INVENTION

The field of the invention relates to systems and methods of nail polish application and developing, creating, and providing nail polish art.

BACKGROUND OF THE INVENTION

Applying nail polish to nails allows users to enhance the appearance of nails while allowing for self-expression and coordination of a user's overall aesthetic presentation. There are a variety of colors of nail polish from which users can select to use on their nails, alone or in combination. There are also a variety of styles and designs that users can employ while applying nail polish. There are also decals or stickers available for users to add onto their nails to enhance nail appearance and achieve self-expression. However, no current system or method allows users to take art, including previously-captured pictures, self-designed images, or other pictures, images, and/or designs, and place them on nails as part of enhancing the appearance of nails and achieving self-expression.

OBJECTS AND SUMMARY OF THE INVENTION

Embodiments of the invention provide a revolutionary new way to create custom nail art by printing a photo into nail polish stickers for a gorgeous, one-of-a-kind manicure that you can apply yourself with no dry-time or waiting. A system and method includes an app to create custom nail art by printing a photograph into fingernail polish stickers for a unique manicure that the user can self-apply. The user may download a mobile app that allows the user to design exactly how a photograph or other image will appear on fingernails. A vendor may then print and ship printed, high-quality nail wraps to the user.

Further details regarding methods, processes, materials, modules, components, steps, embodiments, applications, features, platforms, and advantages are set forth herein and in the U.S. Provisional Application No. 61/941,866, which is incorporated herein by reference in its entirety.

BRIEF DESCRIPTION OF THE DRAWINGS

FIG. 1 is an exemplary depiction of nail designs that have been produced according to embodiments of the invention.

FIG. 15 is an example of a checkout page of the app according to embodiments of the invention.

FIG. 15A is an example of a "share toggle" on a checkout page of the app according to embodiments of the invention.

FIG. 28 is an example of "addresses" and "edit address" pages of the app according to embodiments of the invention.

FIG. 29 is an example of "edit billing info" and "edit saved credit card" pages of the app according to embodiments of the invention.

FIG. 36A is an example of a checkout page of the app according to embodiments of the invention.

FIG. 43 is an example of "addresses" and "edit address" pages of the app according to embodiments of the invention.

DETAILED DESCRIPTION OF THE INVENTION

Illustrative embodiments are now discussed and illustrated. Other embodiments may be used in addition or instead. Details which may be apparent or unnecessary may be omitted to save space or for a more effective presentation. Conversely, some embodiments may be practiced without all of the details which are disclosed.

A system and method includes an app to create custom nail art by printing a photograph into nail polish stickers for a unique manicure that the user can self-apply.

Figure 2A:
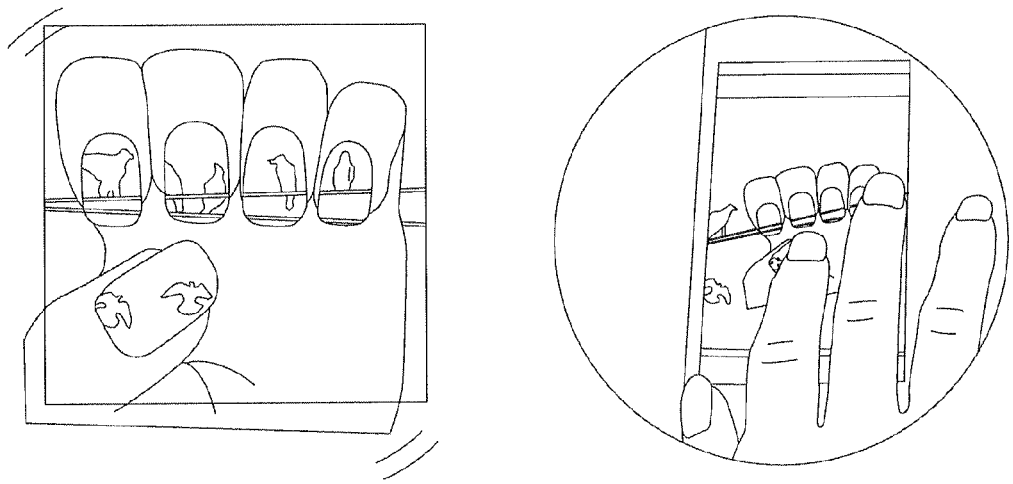
FIG. 2A is an exemplary depiction of a nail design that a user selects or creates according to embodiments of the invention.

In one embodiment, the app is free and lets a user design exactly how the user wants the photo or image to appear on the user's nails. As shown in FIG. 1 and FIG. 2A, a user may create many different possible nail designs.

Figure 2B:
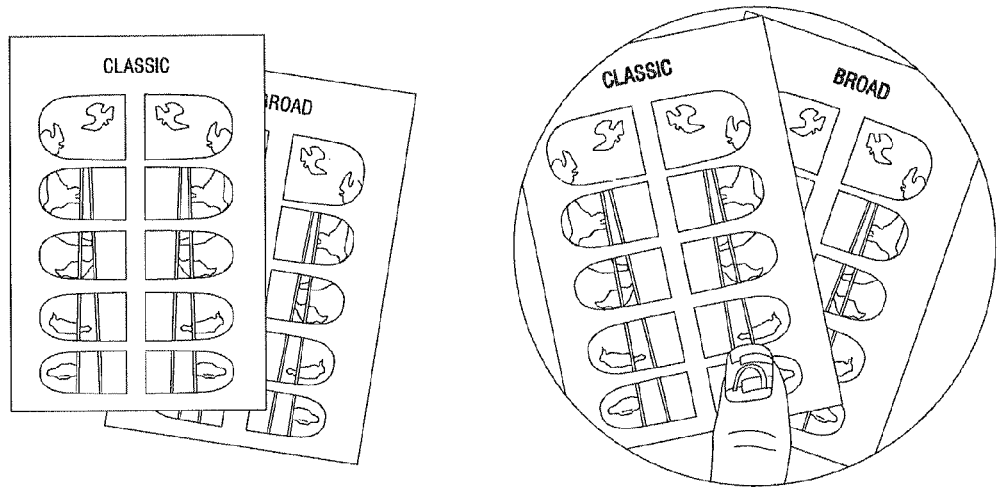
FIG. 2B is an example of printed nail wraps that are shipped to a user according, which can be provided in either a classic or a broad shape according to embodiments of the invention.
Figure 2C:
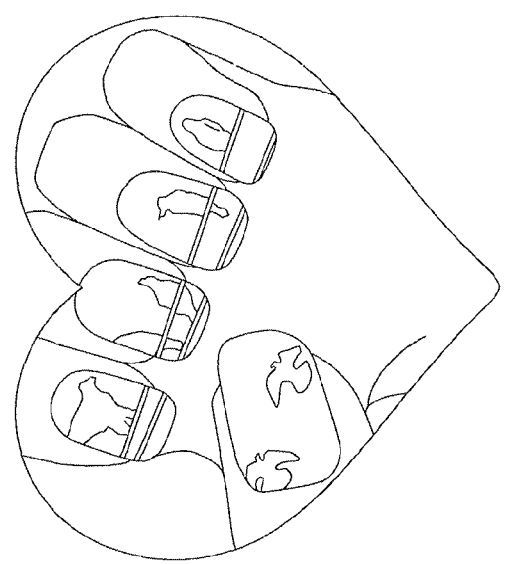
FIG. 2C is an example of printed nail wraps according to embodiments of the invention being worn by a user.

After creating or selecting a nail design FIG. 2A, the user can direct it to be printed. Depending on a user's nail size, the user can select that the nail design be printed in multiple sizes or widths, which can be referred to in the app and on the physical product with various names, including "classic and broad," "kitten, cat, and tiger," "small, medium, and large," or "petite and regular." The user's nail design is then printed as high quality nail wraps and mailed to the user. FIG. 2B provides an example of the printed nail wraps that are shipped to a user. After receiving the printed nail wraps, the user may apply the nail design to the user's nails. An example of nail wraps applied to a user's nails is provided in FIG. 2C.

Embodiments of the invention include an app to create custom nail art by printing a photograph into fingernail polish stickers for a unique manicure that the user can self-apply. The user may download the app that allows the user to design exactly how a photograph or other image will appear on fingernails.

Figure 3:
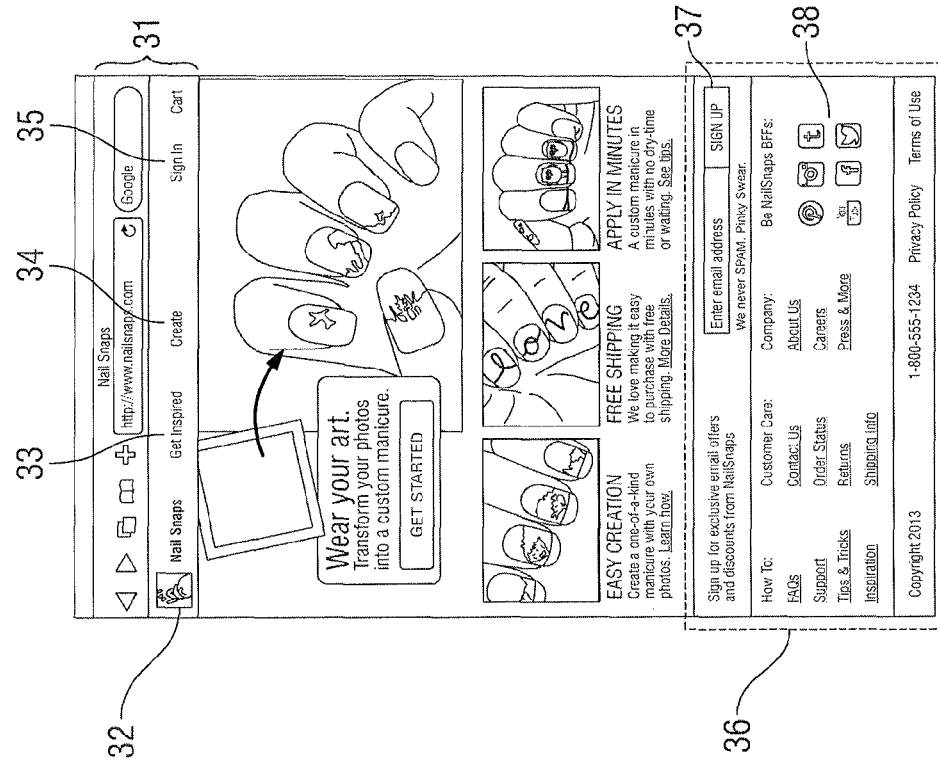
FIG. 3 is an example of a home page of the app according to embodiments of the invention.
Figure 46:
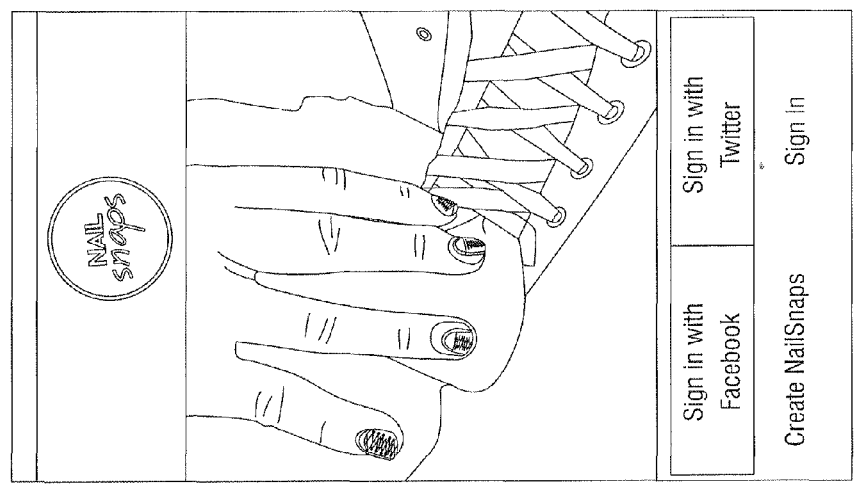
FIG. 46 is an example of a home page of the app according to embodiments of the invention.

In one embodiment, the app has a home page FIG. 3, FIG. 46, which explains what nail wraps or "NailSnaps" are, provides a bit of inspiration, and offers a clear starting point for a user to customize the user's nail art. The app home page may have the following features: the main navigation selections are at the top of every page 31; a NailSnaps Logo, which links back to this home page 32; a "Get Inspired" link, which links to the "Get Inspired" page 33; a "Create" link, which links to a "Create : Choose Source" page 34; and a "Sign In" link 35, which links to a "Sign In/Register Overlay" page. There can also be a link to a "My Account" page.

Figure 4:
FIG. 4 is an example of part of the app that provides a transient chrome-less window that appears in certain embodiments of the invention.

In one embodiment, the app has a footer that is displayed on every page except the creation pages 36. The footer contains a newsletter signup field 37. Once the user submits their email, a transient chrome-less window displays thanks, then closes after 6 seconds FIG. 4. Content for the footer 36 may include social links map to the following accounts 38: Pinterest>pinterest.com/nailsnaps; Instagram>instagram.com/nailsnaps; Tumblr>nailsnaps.tumblr.com/; YouTube>youtube.com/user/nailsnaps ; Facebook>facebook.com/NailSnaps; Twitter>twitter.com/nailsnaps.

Figure 5:
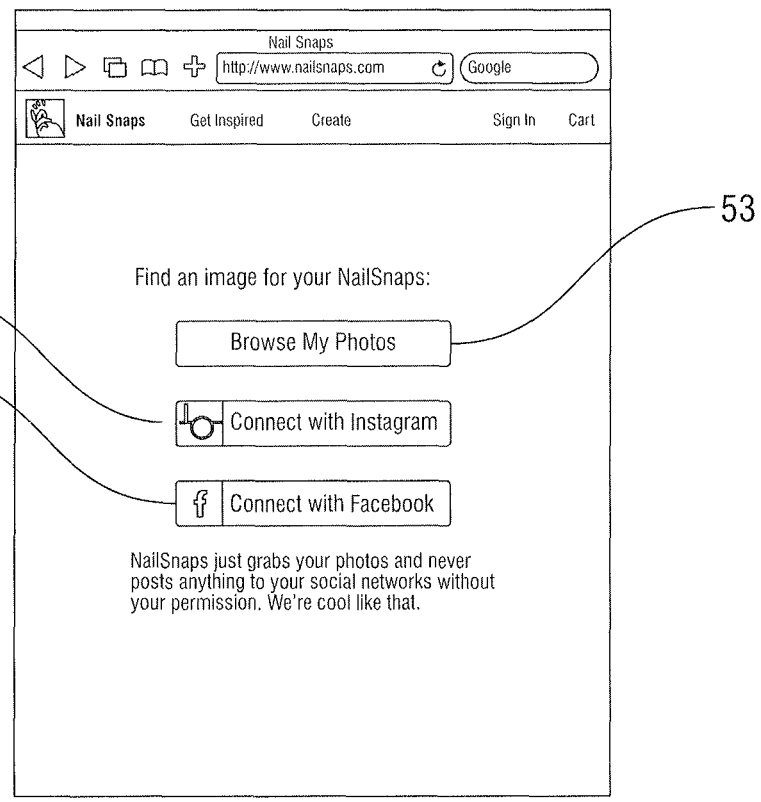
FIG. 5 is an example of one of the creation pages of the app according to embodiments of the invention.
Figure 47:
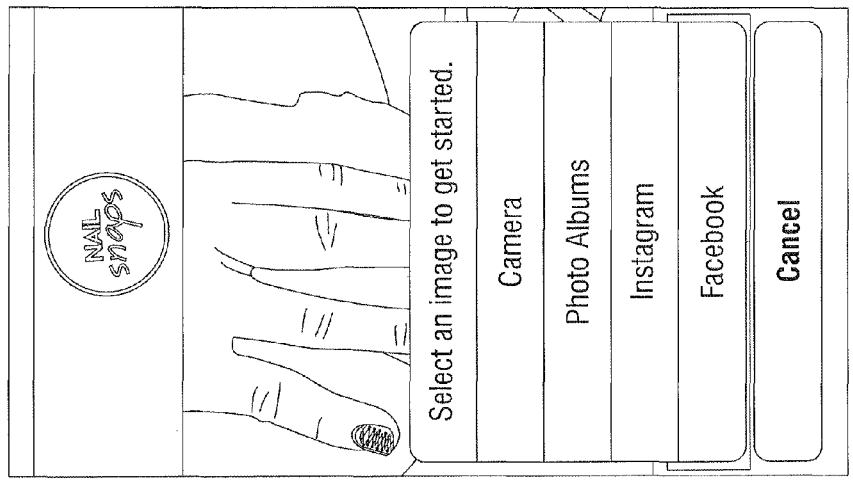
FIG. 47 is an example of one of the creation pages of the app according to embodiments of the invention.

In one embodiment, the app includes creation pages that allow a user to create the nail designs that it wishes to use to create the user's nail wraps FIG. 5, FIG. 47. The user chooses a source that contains pictures or images to connect with FIG. 5, FIG. 47 to begin the creation flow, including social media connections such as Instagram 51, Facebook 52, or a device's internal camera or locally stored photos.

Figure 6A:
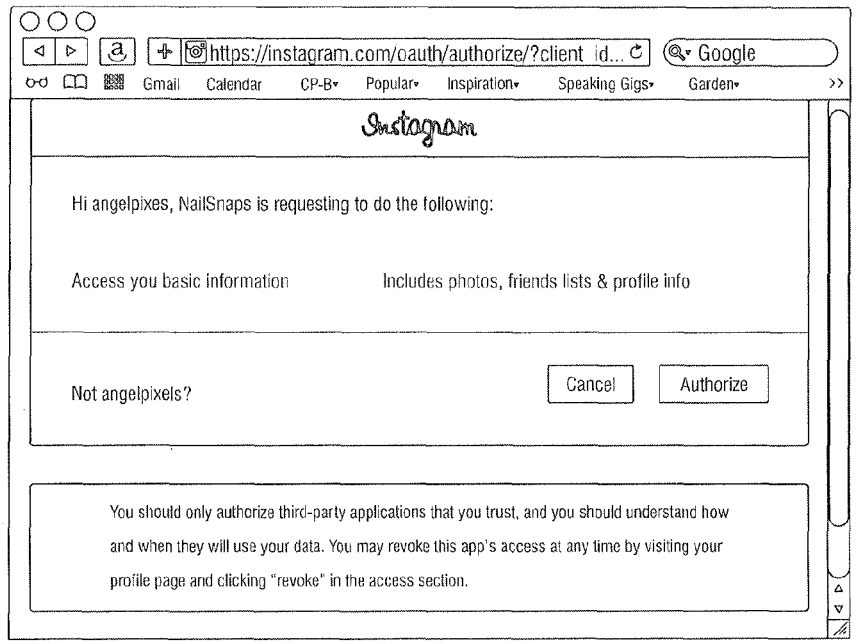
FIG. 6A is an example of one of the connection windows for the creation pages of the app according to embodiments of the invention.

If a user chooses to connect with Instagram 51, then the app opens an Instagram Connect window FIG. 6A over the existing creation page FIG. 5. If a user chooses to connect with Facebook 52, then the app opens a Facebook Connect window FIG. 6B over the existing creation page FIG. 5. After a social media connection has been authorized, the user's photos in the social media platform are displayed. Alternatively, if the user is using the app on a device with a camera, the user can choose to use the device's camera to take a photo to use for the creation process or it can use any of the photos stored on the device.

On the creation page FIG. 5, if a user chooses a "browse" option 53, then the app opens the devices' photo library. If a user chooses one of the social networks and accepts permissions to access it, the app opens a browseable interface for the user's photos on that network.

Figure 6B:
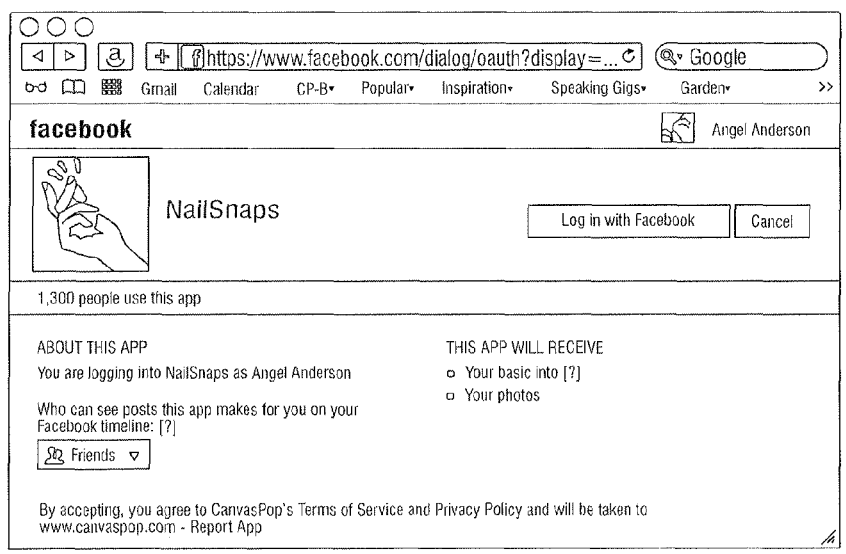
FIG. 6B is an example of one of the connection windows for the creation pages of the app according to embodiments of the invention.
Figure 7:
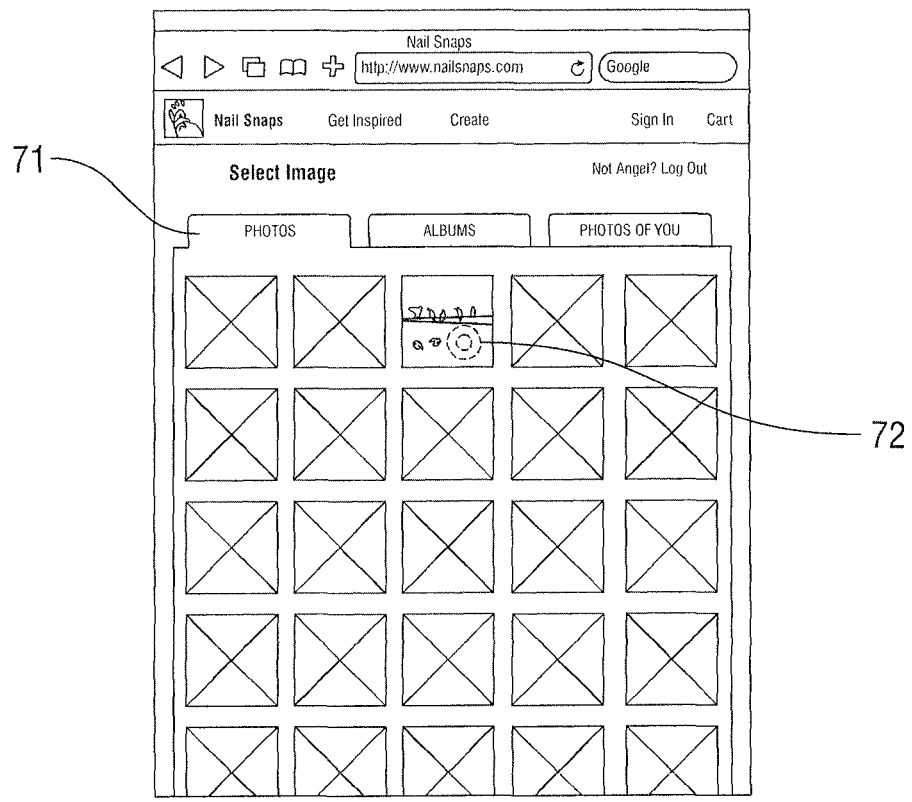
FIG. 7 is an example of one of the browse interfaces of the app according to embodiments of the invention.

If a user chooses the "Connect with Facebook" option 52 from the creation page FIG. 5 and accepts the permissions to proceed with Facebook FIG. 6B, then the app provides Facebook browse tabs. FIG. 7 shows what the browse interface looks like if the user chooses to browse photos from her Facebook account. Browsing Instagram photos looks roughly the same minus the photo category tabs. While browsing photos on Facebook 71, a user can select an image 72. A user can tap any photo 72 to select that image for her manicure.

Figure 8:
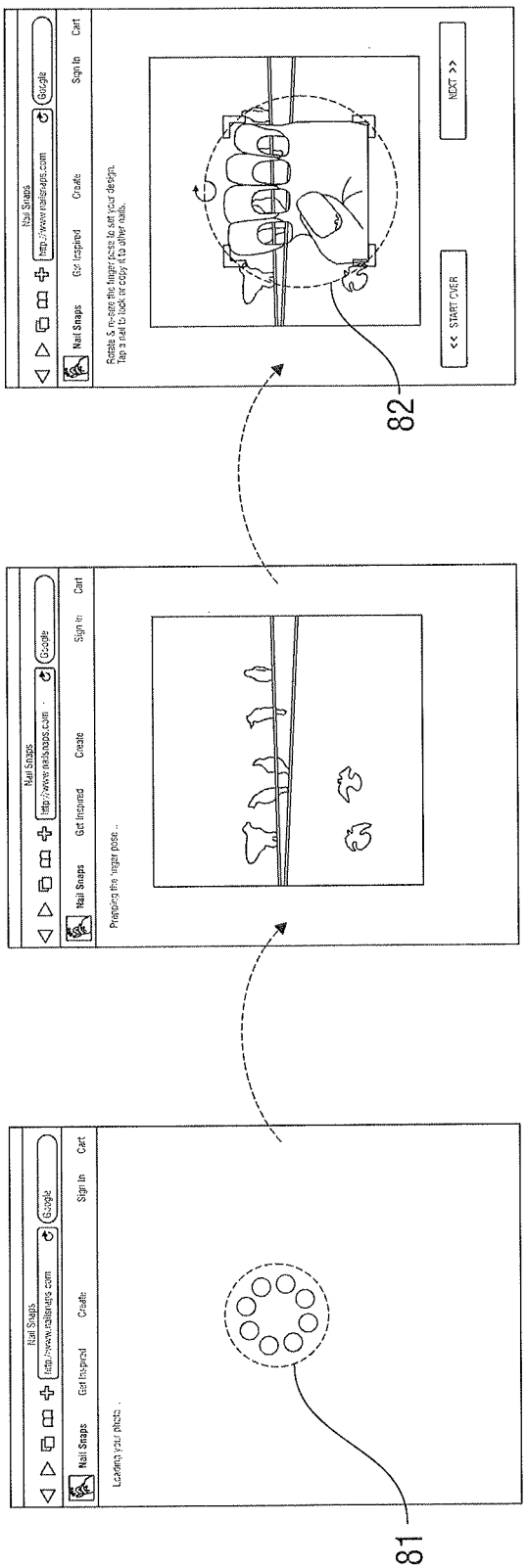
FIG. 8A is an example of one of the creation pages of the app according to embodiments of the invention.
FIG. 8B is an example of one of the creation pages of the app according to embodiments of the invention.
FIG. 8C is an example of one of the creation pages of the app according to embodiments of the invention.
Figure 9:
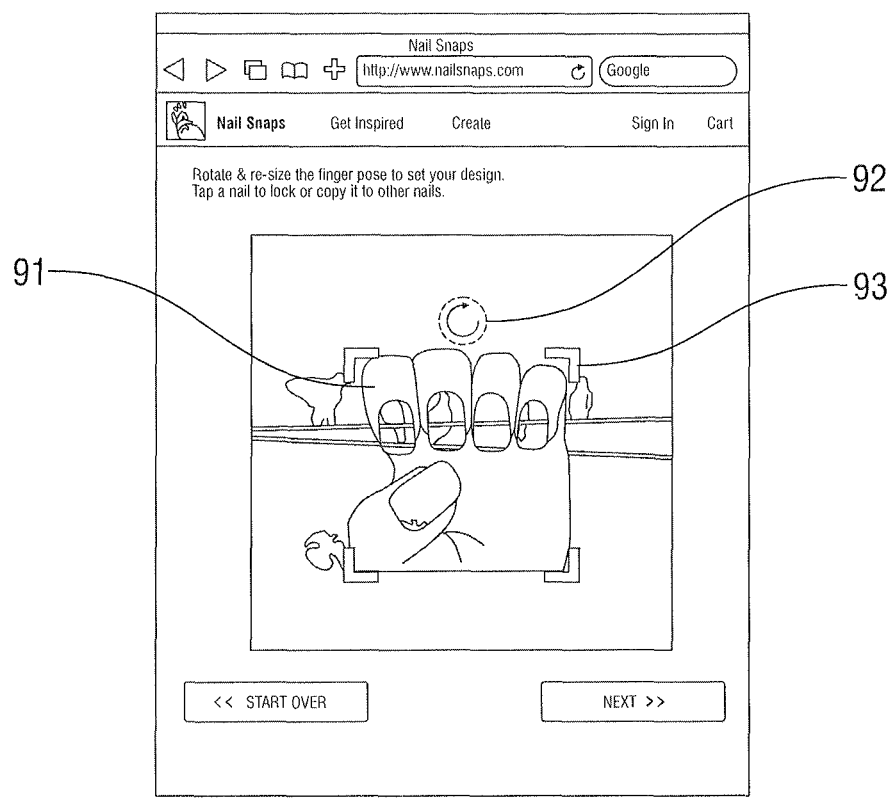
FIG. 9 is an example of one of the creation pages of the app according to embodiments of the invention.

After a user selects a photo to use to create nail wraps for her manicure, the creation pages of the app provides a loading screen FIG. 8A. The loading screen provides an animation that lets the user know that something is happening 81. In a preferred embodiment the loading screen animation 81 can be nails tapping on a surface. After the photo loads, the creation pages of the app present the photo to the user so that the user can see the image she is working with to create nail wraps FIG. 8B. Then, the app provides instructions, a finger pose stencil, and controls 8C. These elements appear at the same time to let the user place begin to customize her nail wraps design 82.

In one embodiment, after a user selects an image, the user uses a Finger Pose Stencil provided in a creation page of the app to arrange the image how the user wants it to appear on her nail wraps FIGS. 9, 10, 12A, 12B, 13, 42, 44. The creation page explains how to use the Finger Pose Stencil and provides instructions FIG. 9, FIG. 44. The Finger Pose Stencil preferably uses a finger pose called "Tiger Claw," 91, which is the most common hand or finger pose for women to show off a manicure in a photo, but other finger or hand poses and custom finger or hand poses based on a user's own hand or nails or measurements may also be used as described herein. The user controls how she wants her photo to appear on her nails by rotating 92 and re-sizing 93 the hand or finger pose.

Figure 10:
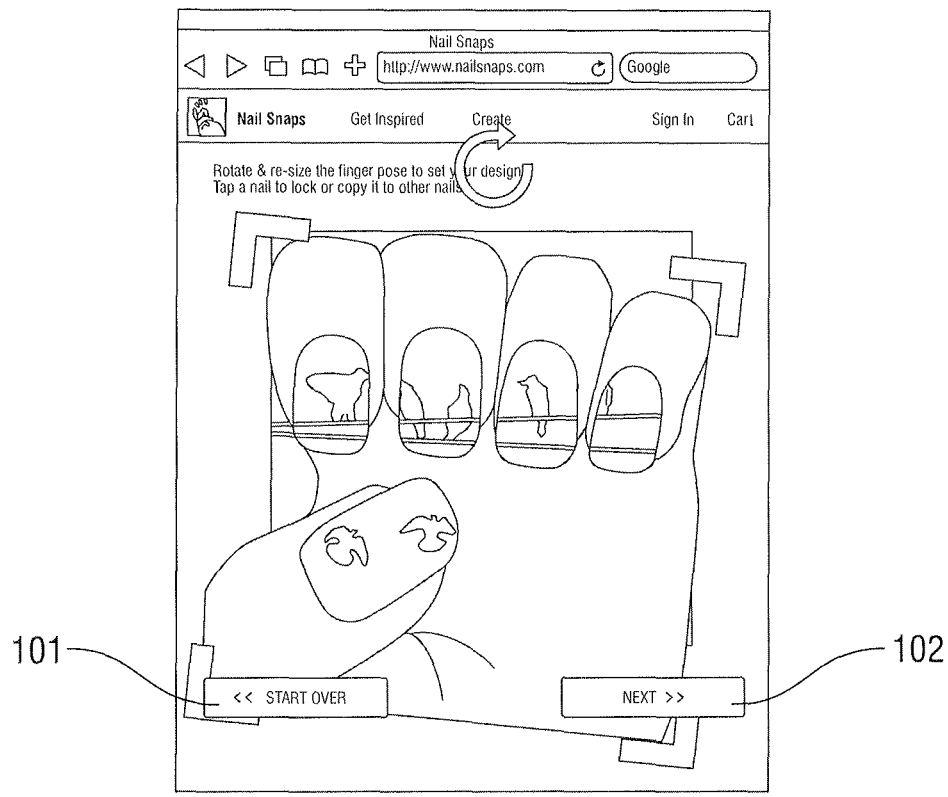
FIG. 10 is an example of one of the creation pages of the app according to embodiments of the invention.
Figure 48:
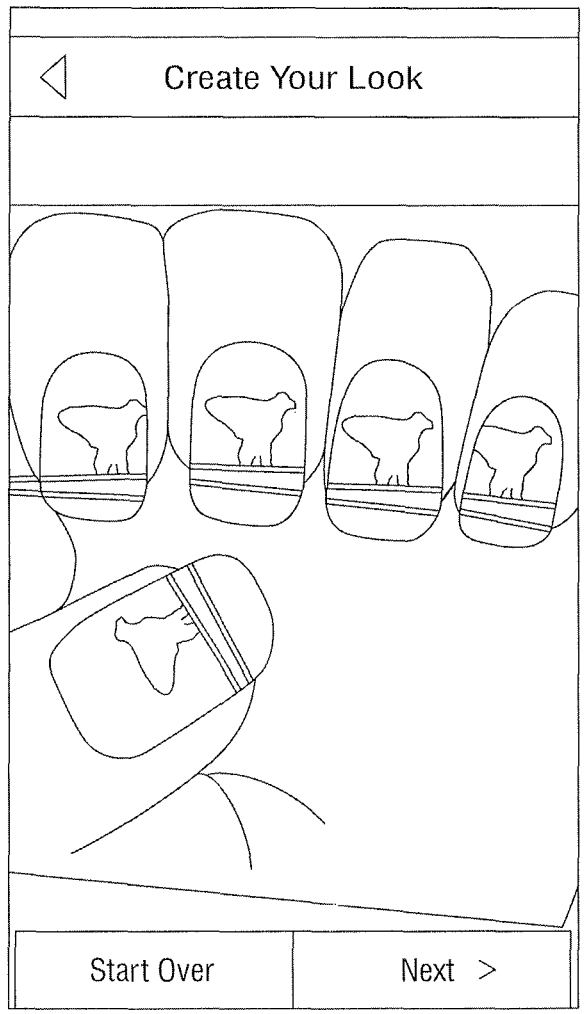
FIG. 48 is an example of one of the creation pages of the app according to embodiments of the invention.

The user may re-position 92 or re-size 93 the image using two-finger gestures on touch screens to stretch the hand. On non-touch devices, a user may click a corner to drag the hand larger. The user may rotate the image using two finger twist gestures on touch screens to rotate the hand. On non-touch devices, a user may click the rotate icon and drag left or right to rotate. FIG. 10 and FIG. 48 provide examples of how a user might rotate and re-size the Tiger Claw finger pose on a particular image to create NailSnaps that show the "birds on a wire" image across the manicure.

Figure 12B:
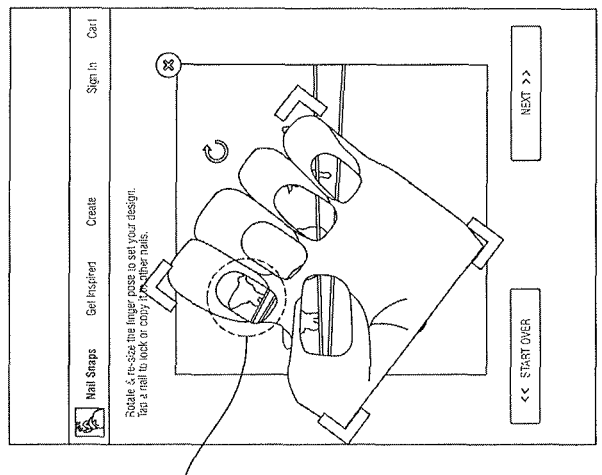
FIG. 12B is an example of one of the creation pages of the app according to embodiments of the invention.

On a creation page FIGS. 9, 10, 12A, 12B, 13, 14 42, 44 a user may also choose to lock an image on a nail. A user locks an image on a nail by tapping the nail. After locking the image coordinates for a particular nail, a user may continue to rotate and re-size the hand, as shown in FIG. 12. If a user locks a nail and then re-sizes the hand, the aspect ratio for image coordinates may remain consistent to the hand pose at the time the nail was locked. The hand pose stencil includes image coordinates for the fingernails of the hand pose stencil. Once the image coordinates from the pointer finger are locked, the user can continue to re-size and rotate the finger pose but the aspect ratio of the locked image coordinates remains fixed relative to the finger pose. For example in FIG. 12A, the bird image on the pointer finger nail was locked. In FIG. 12B, after the finger pose was re-sized, the bird image on the pointer finger nail 121 remained the same relative to the pointer finger nail even though the finger pose was re-sized smaller.

Figure 12A:
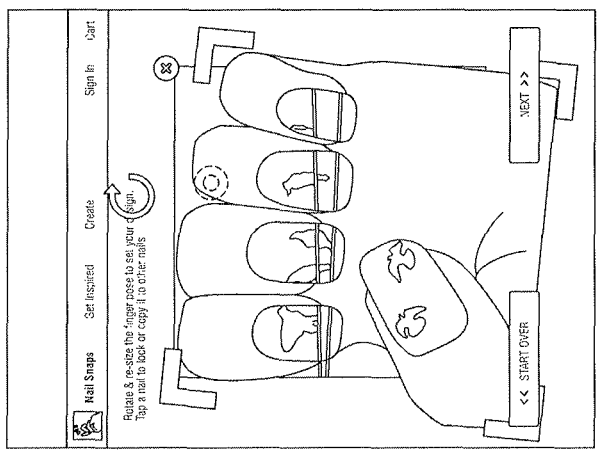
FIG. 12A is an example of one of the creation pages of the app according to embodiments of the invention.
Figure 13:
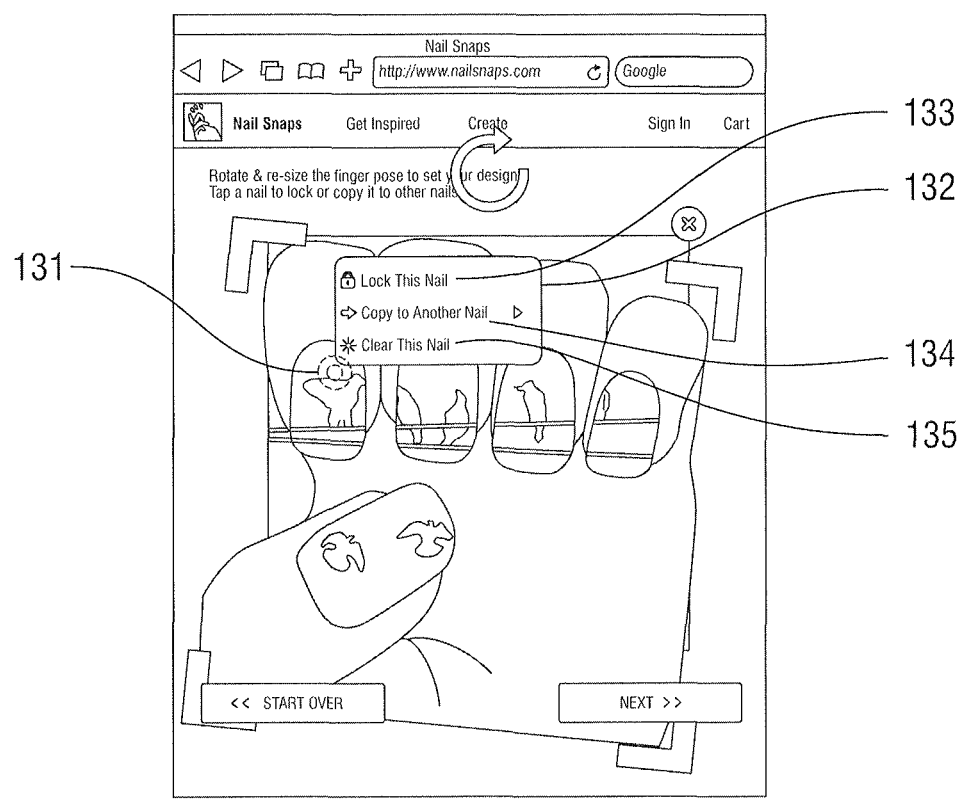
FIG. 13 is an example of one of the creation pages of the app according to embodiments of the invention.
Figure 14:
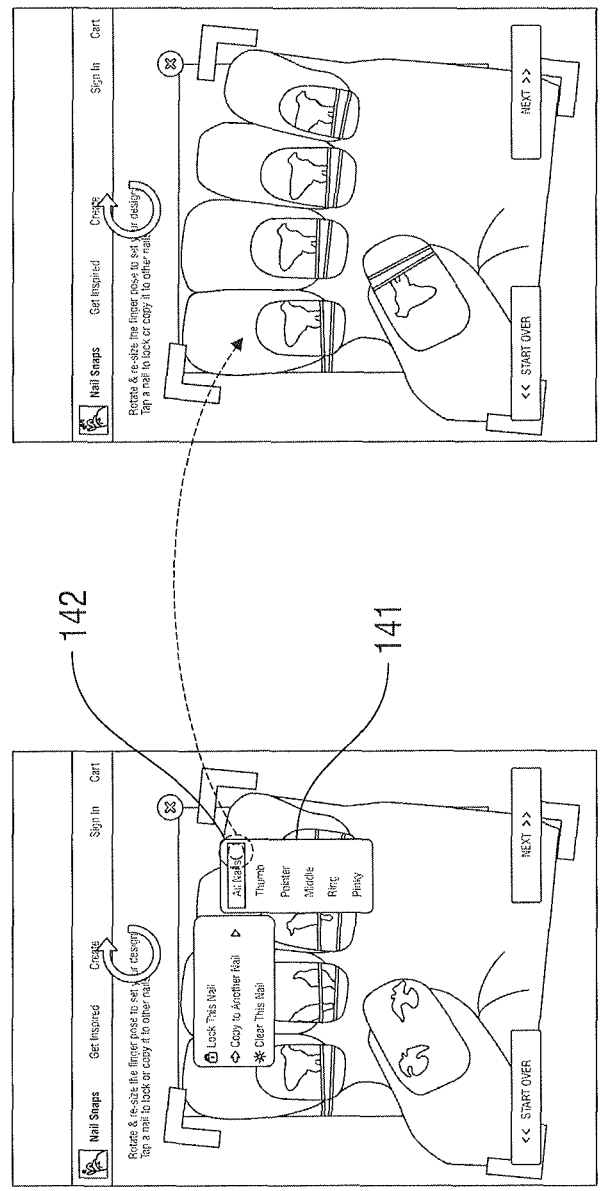
FIG. 14 is an example of one of the creation pages of the app according to embodiments of the invention.

When trying to lock a nail on a creation page FIGS. 12A, 12B, a user may tap a specific nail to lock it or to copy the image on the nail. As shown in FIG. 13 and FIG. 14, tapping on a particular nail 131 brings up controls 132 for the image coordinates that appear on that nail, including "Lock This Nail" 133, "Copy to Another Nail" 134, and "Clear This Nail" 135. Image coordinates consist of a cuticle base curve and a directional line. Selecting "Lock This Nail" 133 lets the user lock the image coordinates for that particular nail so that nail stays the same even while the user continues re-sizing and rotating the hand 121. Selecting "Copy To Another Nail" 134 lets the user copy the image coordinates for that particular nail to other fingers FIG. 14. Selecting "Clear This Nail" 135 is an option if a nail has been locked or its coordinates copied from another nail. The "Clear This Nail" 135 control lets the user clear the lock or copy so that the nail simply shows whatever part of the image is beneath it. The "Clear This Nail" option is disabled if no lock or copy from another nail has been applied.

If a user selects the "Copy to Another Nail" option 135, then the user will have several additional selection options 141. For example, a user can paste the image coordinates for the pointer finger to the ring finger so that the same image coordinates appear on both the pointer and the ring finger. The nail that receives the copy is now locked with the image coordinates that were copied to it. If a user wants to copy a nail to multiple nails but not all, this will have to be done in multiple steps. Aspect ratio for image coordinates remains consistent to the nail from which it was copied; i.e., the image will remain at the same level of zoom across all nails. For example, when image coordinates from the pointer finger are copied to the thumb, more of the surrounding image will appear on the thumb. Those same image coordinates copied to the pinky will show less of the surrounding image. FIG. 14 provides an example of one embodiment where a user taps the "All Nails" selection button 142 and decides to copy an image from the pointer finger to all nails. Thus, image coordinates may include measurements of the cuticle base curve and a directional line extending down the middle of the nail from the cuticle base curve. Image coordinates vary depending on the size and shape of a nail. Typically, a thumb nail will have a different cuticle base curve than a pinky finger.

Figure 11:
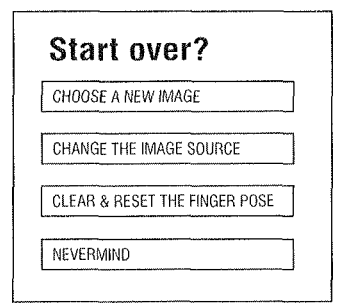
FIG. 11 is an example of a dialogue box of one of the creation pages of the app according to embodiments of the invention.

On a creation page FIGS. 9, 10, 12A, 12B, 13 there is a "start over" button 101 and a "next" button 102. A user may select the "start over" button 101 if she wants to start over in any way. If a user selects the "start over" button 101, a dialogue box FIG. 11 is presented to the user. This dialogue box allows a user to start over at various creation pages, including FIG. 7 (choose an new image from the same source) and FIG. 5 (choosing a source for an image). A user may also select an option to undo any specific locked images for any nail FIG. 12B and place the hand in the original size and orientation with all nails cleared. The "nevermind" option allows a user to exit the "start over" dialogue box FIG. 11.

A user may select the "next" button 102 after she has positioned the hand (the Finger Pose Stencil) on the image. If a user selects the "next" button 102, the user proceeds to one of potentially several or one or more "checkout" pages.

In one embodiment of the invention, the app provides one or more "checkout" pages, which can include a series of checkout pages. In one embodiment there is a "save" checkout page FIG. 15. On a "save" checkout page FIG. 15, there is a preview of the image that the user selected to create her nail snaps 151 and the nail snaps that the user created 152. The preview of the user's nail snaps 152 allows the user to edit the layout of the nail snaps 152 and to name the user's nail snaps design 153. By selecting the "modify" button 154 on the checkout page FIG. 15, a user is taken back to a creation page FIGS. 9, 10, 12, 13, 42, 44 to continue editing the nail snaps.

On a "save" checkout page FIG. 15, a user is also permitted to name 153 the nail snaps she created. The nail snaps design is automatically named according to the title of the image used to create the nail snaps, which is pulled from either the device or social network, depending from where the image was taken. A user may edit or change the pre-populated "name" field 153 as desired.

Also on a "save" checkout page FIG. 15, a user is given the option to share 155 her nail snaps design on various social media platforms by using "share toggles" 155, FIG. 15A. If the user is already logged into a social media account, then the first time they tap these icons, they must connect the app to that network. If the user is not logged in or registered, she will need to do that first before she can share. Tapping the a share link makes the share icon go from grey (off) to blue (on) 155, FIG. 15A.

Also on a "save" checkout page FIG. 15, a user is given the option to "publish" 156 her nail snaps design. Selecting the "Publish" option 156 posts the user's nail wraps design photo to the "Get Inspired" gallery. There is also provided a marketplace where users can publish their designs. In the marketplace, users can buy and sell each other's designs. To do this, users will be able to check a box that asks them if they want to publish and sell their deigns, which will allow them to earn money from the designs they created.

Figure 32:
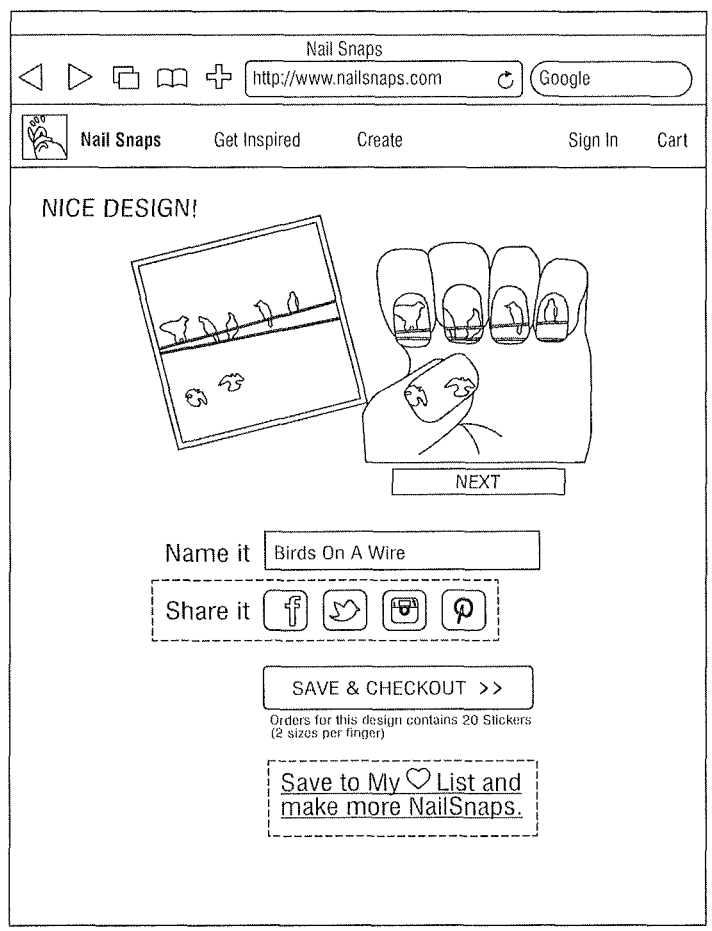
FIG. 32 is an example of a checkout page of the app according to embodiments of the invention.
Figure 33:
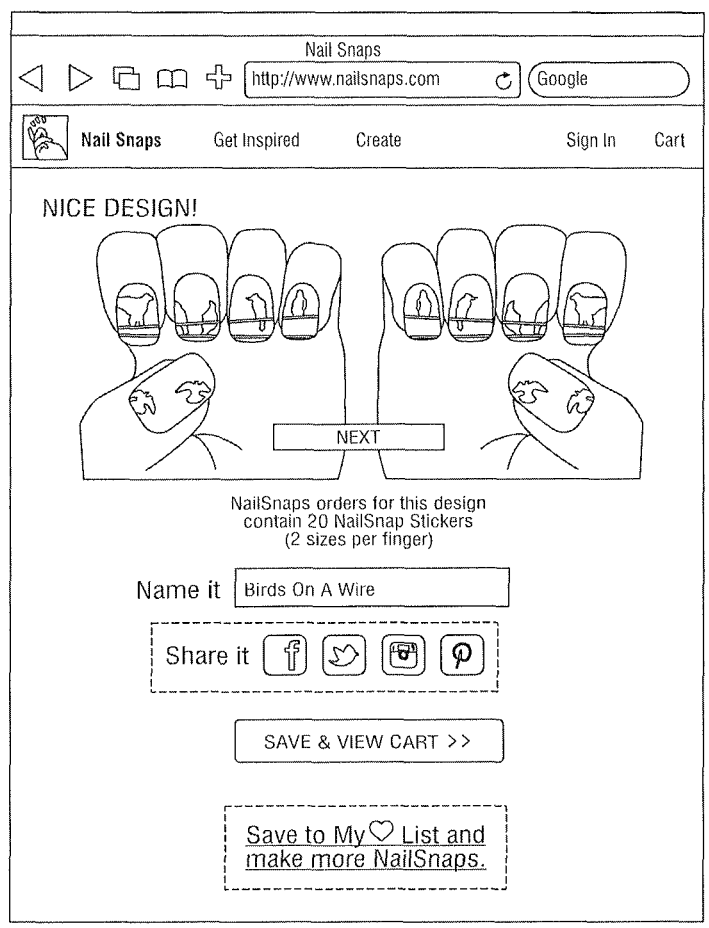
FIG. 33 is an example of a checkout page of the app according to embodiments of the invention.
Figure 34:
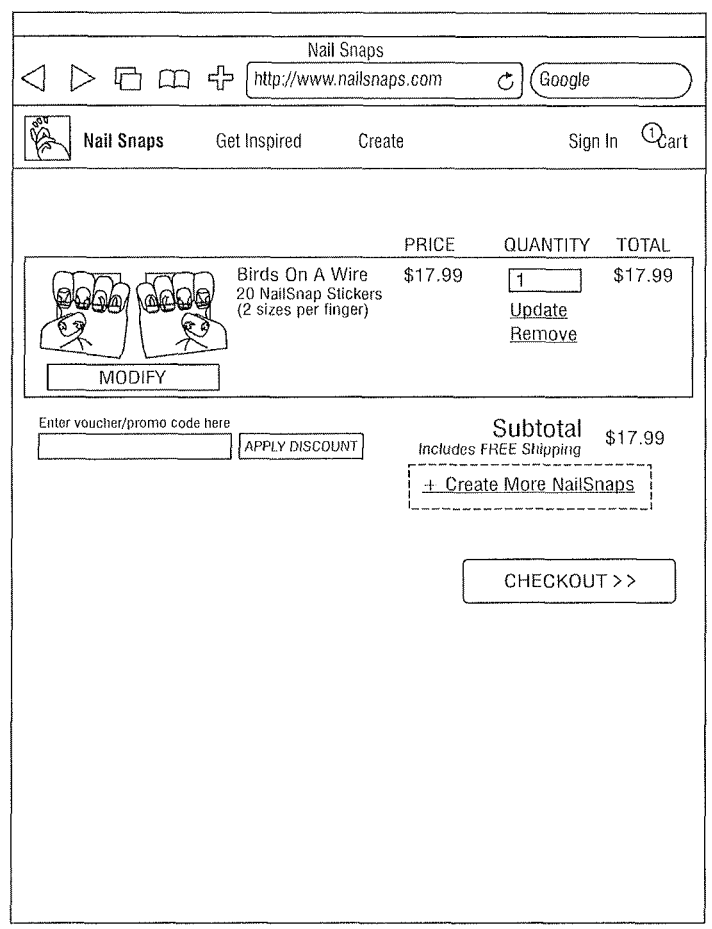
FIG. 34 is an example of a view cart checkout page of the app according to embodiments of the invention.
Figure 35:
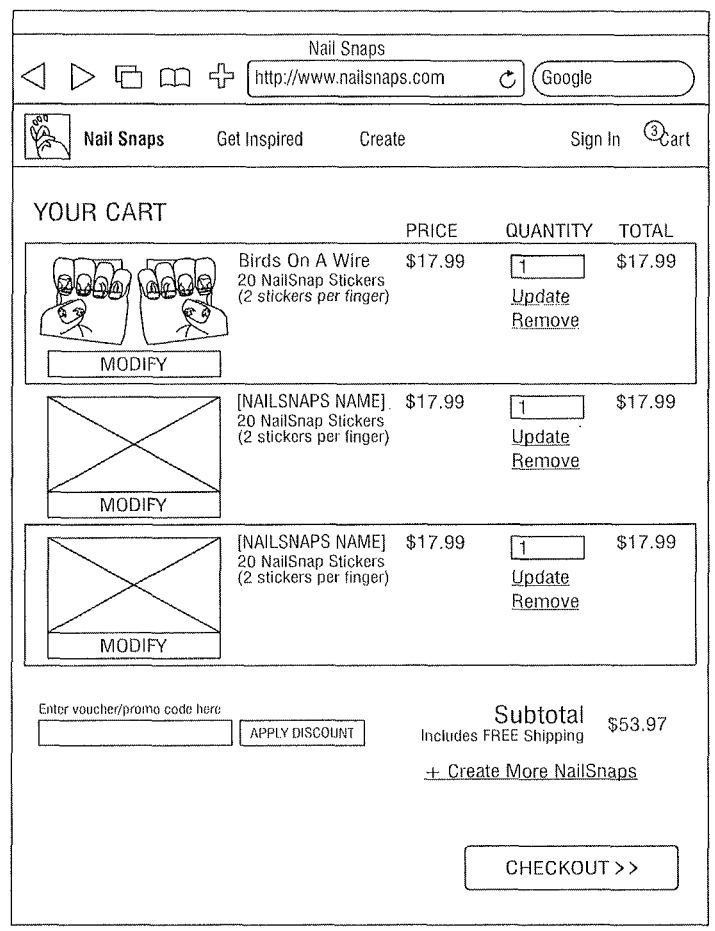
FIG. 35 is an example of a view cart checkout page of the app according to embodiments of the invention.

Also on a "save" checkout page FIG. 15, a user is given the option to "Save & View Cart" 157. If a user selects this option, the user's nail wraps design is saved to the user's favorite or "heart" list and if she has toggled any of the social networks to the ON position, her work is shared to that network. After tapping the "Save & View Cart" button 157, if a user is signed in, the app performs a save function and then opens the user's shopping cart page. If a user is not signed in, then the app opens the chrome-less create account/sign in pop-up 36. After the user successfully signs into her account, the app performs a save and then opens the shopping cart or cart view page. FIG. 32 and FIG. 33 are additional embodiments of "save" or "save & share" checkout pages of the app according to embodiments of the invention. FIG. 34 and FIG. 35 are examples of embodiments of "view cart" checkout pages of the app according to embodiments of the invention for one or multiple items, respectively.

Also on a "save" checkout page FIG. 15, a user is given the option to "Save to My "Heart" List" 158. If a user selects this option by tapping this link 158, then the app saves the user's nail wrap design and follows the same rules for sign in but takes the user back to a creation page FIG. 5 where the user can choose a source from which to select images to use to create custom nail wraps.

Figure 16:
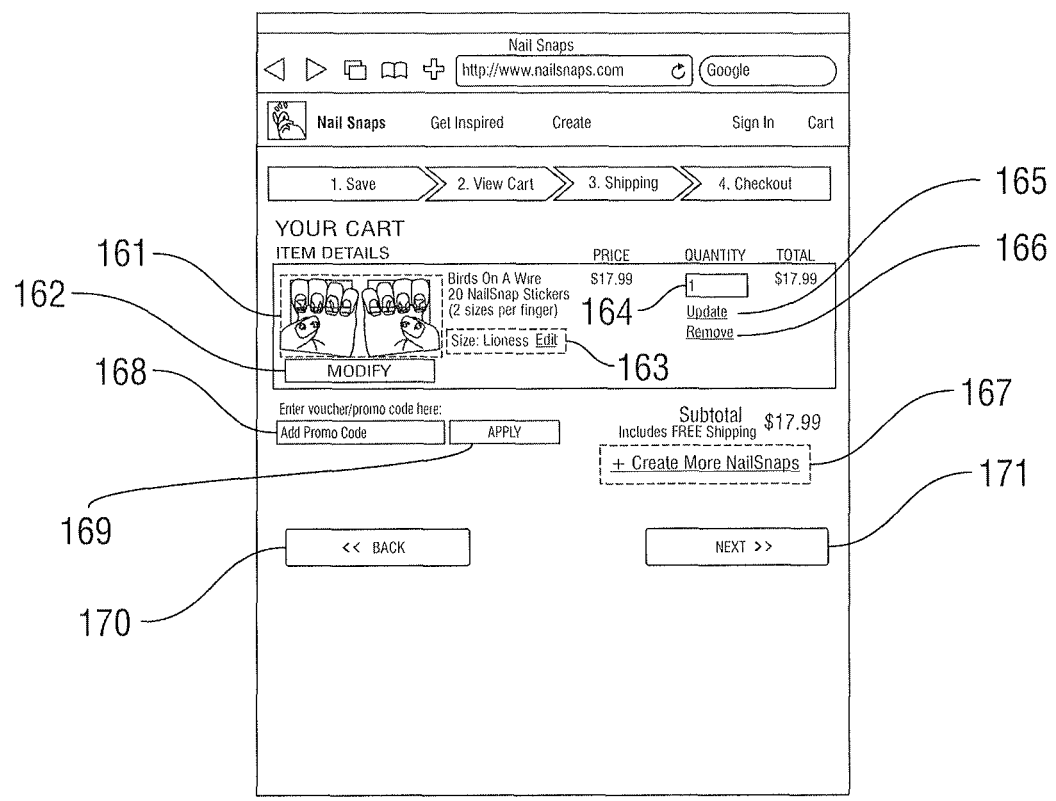
FIG. 16 is an example of a checkout page of the app according to embodiments of the invention.

On a "view cart" checkout page FIG. 16, there is an image preview of the nail snaps that the user created 161. If the user taps a "modify" button below the image preview of the nail snaps 162, the user is taken back to a creation page FIGS. 9, 10, 12, 13 to modify the layout of her nail design 161.

Also on a "view cart" checkout page FIG. 16, a user is given the option to select the size of her nail wraps 163 by selecting an "edit" button 163 beside the "size" option. Depending on a user's nail size, the user can select that the nail design be printed in multiple sizes or widths, which can be referred to in the app and on the physical product with various names, including "classic and broad," "kitten, cat, and tiger," "small, medium, and large," or "petite and regular." Every order can be shipped in cat/medium/regular/classic size and an additional size or other sizes, depending on the user's selection and preferences. The various sizing options provide maximum flexibility for fitting various nail sizes.

Also on a "view cart" checkout page FIG. 16, a user is given the option to select the quantity 164 of nail wraps she wants. A user can change the quantity to buy by editing the number in the "quantity" field 164. Under the "quantity" field 164, there are 3 links: "Update," 165, which updates the subtotal to reflect changes to the quantity number the user has made (reloads the page if needed.); "Remove," 166, which deletes the item from the cart (If the cart becomes empty, copy appears saying, "You have no items in your cart"); and "Create A NailSnaps Design," 167, which takes the user back to the beginning of the creation flow.).

Also on a "view cart" checkout page FIG. 16, a user is given the option to enter a voucher or promotional code in a "Voucher/Promo Code Field," 168, which lets the user enter a code to reduce the price. To use this field, the user enters a voucher or promotional code and taps "Apply Discount" 169 to update the subtotal with the discount. The app reloads the page if needed.

Also on a view cart checkout page FIG. 16, a user is given the option to select "Create More NailSnaps," 167, which is a link that takes the user away from the checkout pages, leaving the current items in the cart, and returns the user to the beginning of the creation flow to create and add another design.

Also on a view cart checkout page FIG. 16, a user is given the option to go back by selecting the "Back" button, 170, which takes the user back to the previous save checkout page FIG. 15.

Also on a view cart checkout page FIG. 16, a user is given the option to continue by tapping the "Next" button 171 which takes the user to the Shipping page. Once a person is satisfied with the item(s) in her cart, she may tap or click the "Next" button 171.

Figure 17:
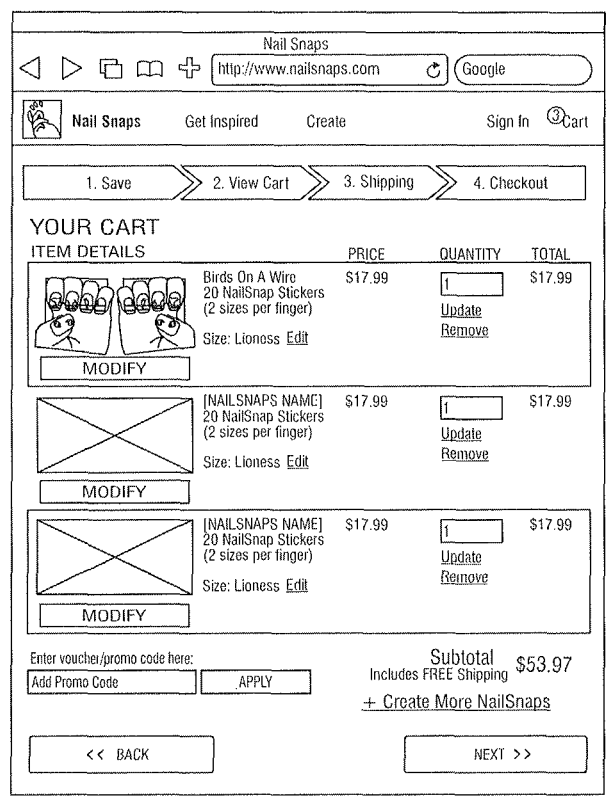
FIG. 17 is an example of a checkout page of the app according to embodiments of the invention.

If a user has created multiple nail wraps designs, she may include all of them in her cart FIG. 17. FIG. 17 provides an example of a view cart checkout page in one embodiment of the invention where the app saves the new designs that a user creates and saves them to the cart. New rows may appear on alternating background colors.

Figure 18:
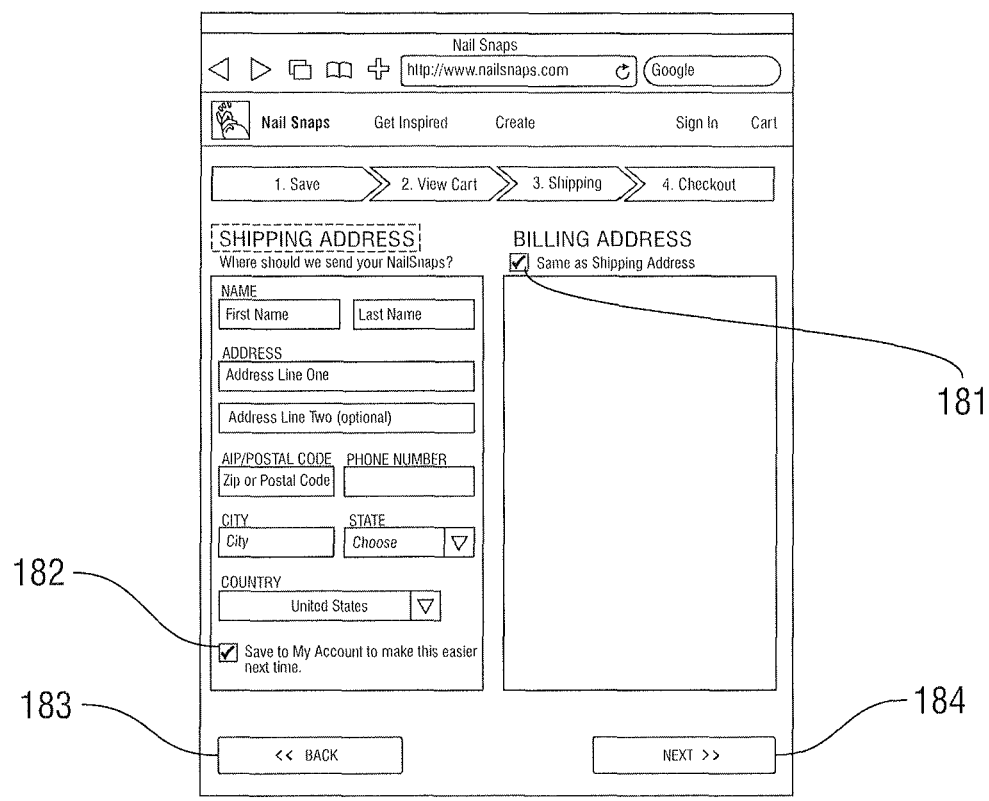
FIG. 18 is an example of a checkout page of the app according to embodiments of the invention.

On a "shipping" checkout page FIG. 18, a user is given the option to enter her shipping and billing information. In a preferred embodiment of the invention, all shipping address fields are required and the zip code field is higher in the order than it normally appears to save user time because once a user completes the zip code field, the city, state, and country fields auto-populate. The user may select that the same address be used for shipping and billing 181. A user may select that the address be saved to her account for future use 182. Also on a shipping checkout page FIG. 18, a user is given the option to go back by tapping or selecting the "Back" button 183, or the user may continue by tapping or selecting the "Next" button 184, which takes the user to a "checkout" page of the checkout pages FIG. 19.

Figure 19:
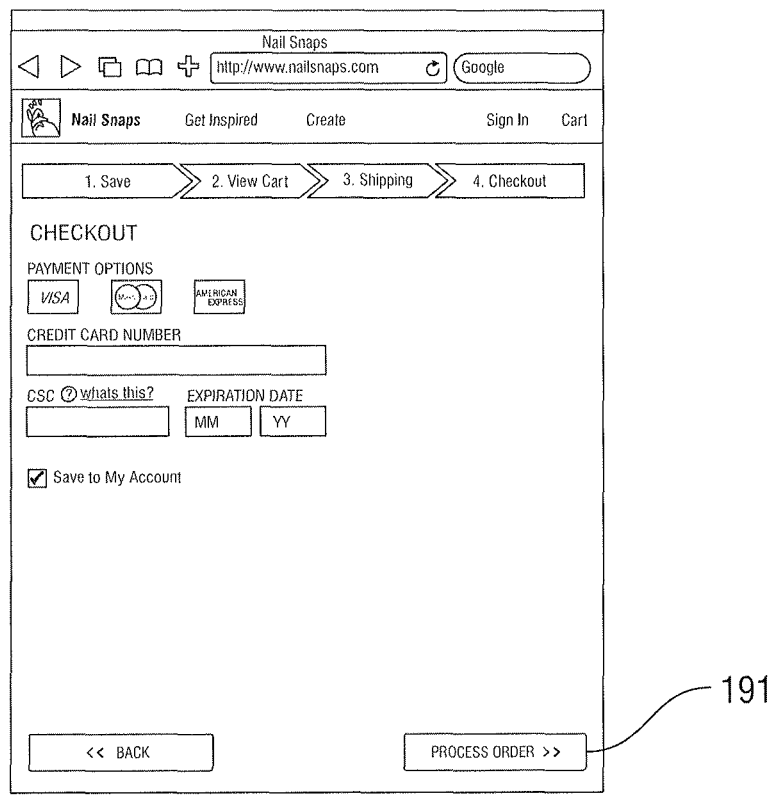
FIG. 19 is an example of a checkout page of the app according to embodiments of the invention.
Figure 20:
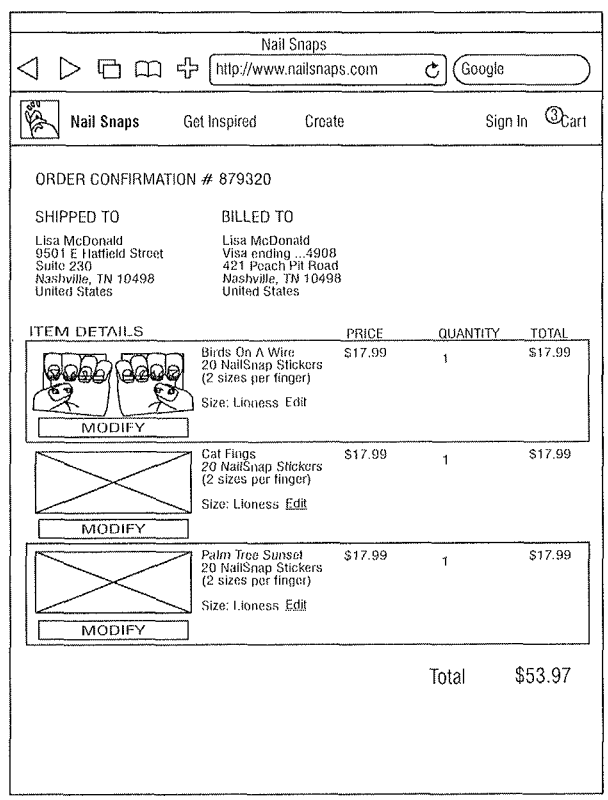
FIG. 20 is an example of a checkout page of the app according to embodiments of the invention.

Also on a "checkout" page of the checkout pages FIG. 19, a user enters her payment information, which typically constitutes credit card information, although payment by PayPal, gift card, and other payment options may be possible and can also be accepted or used. Once a user enters her financial information, she may select the "Process Order" button 191, which submits the users order. After selecting the "Process Order" button 191, the user is taken to a final order confirmation page FIG. 20. The order confirmation page FIG. 20 provides an order confirmation number, presents the shipping and billing address(es), and provides the details of the user's order, including quantity, images, sizes, price, and total cost.

Figure 36A:
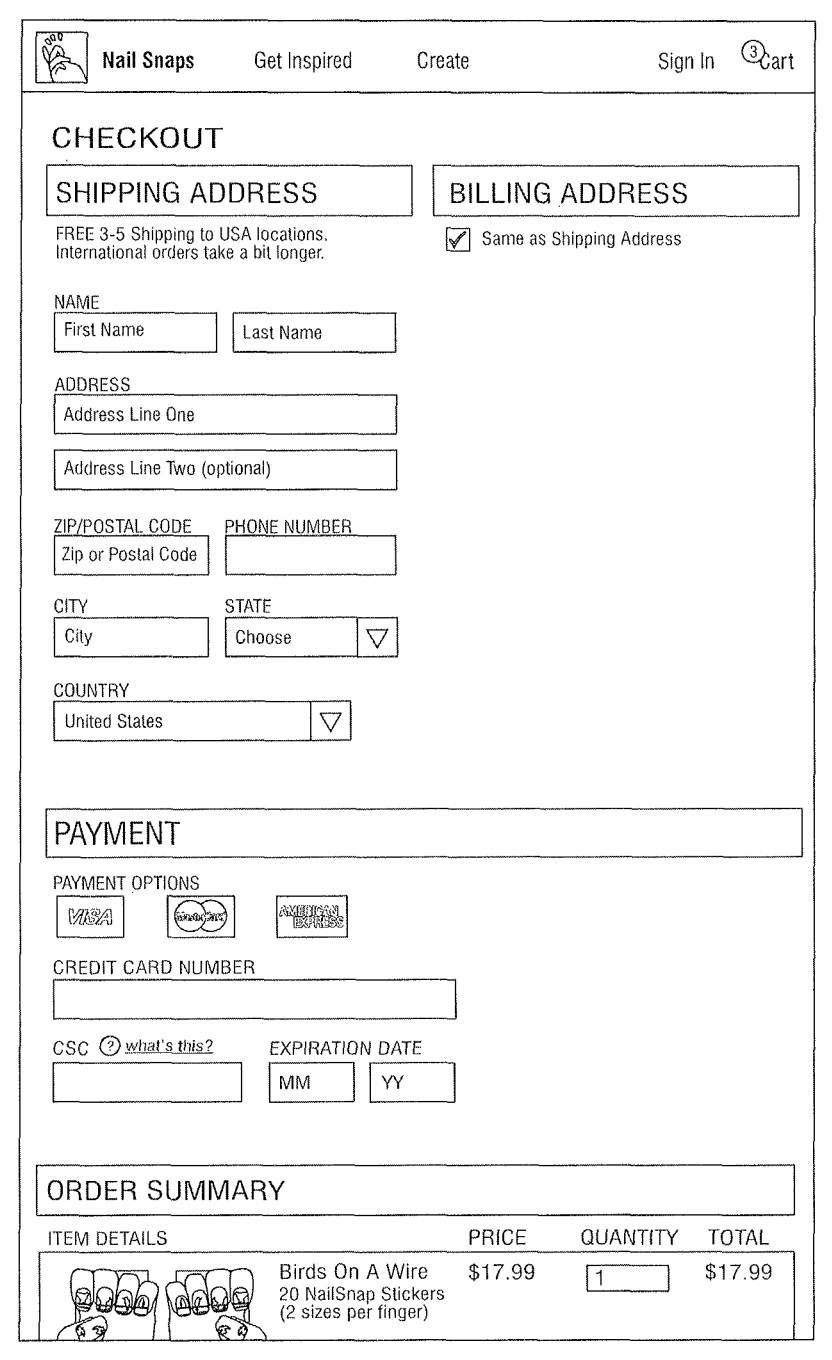
Figure 36B:
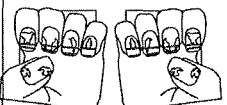
FIG. 36B is an example of a checkout page of the app according to embodiments of the invention.

FIGS. 36A and 36B together are an example of a continuous checkout page of the app according to embodiments of the invention.

Figure 21:
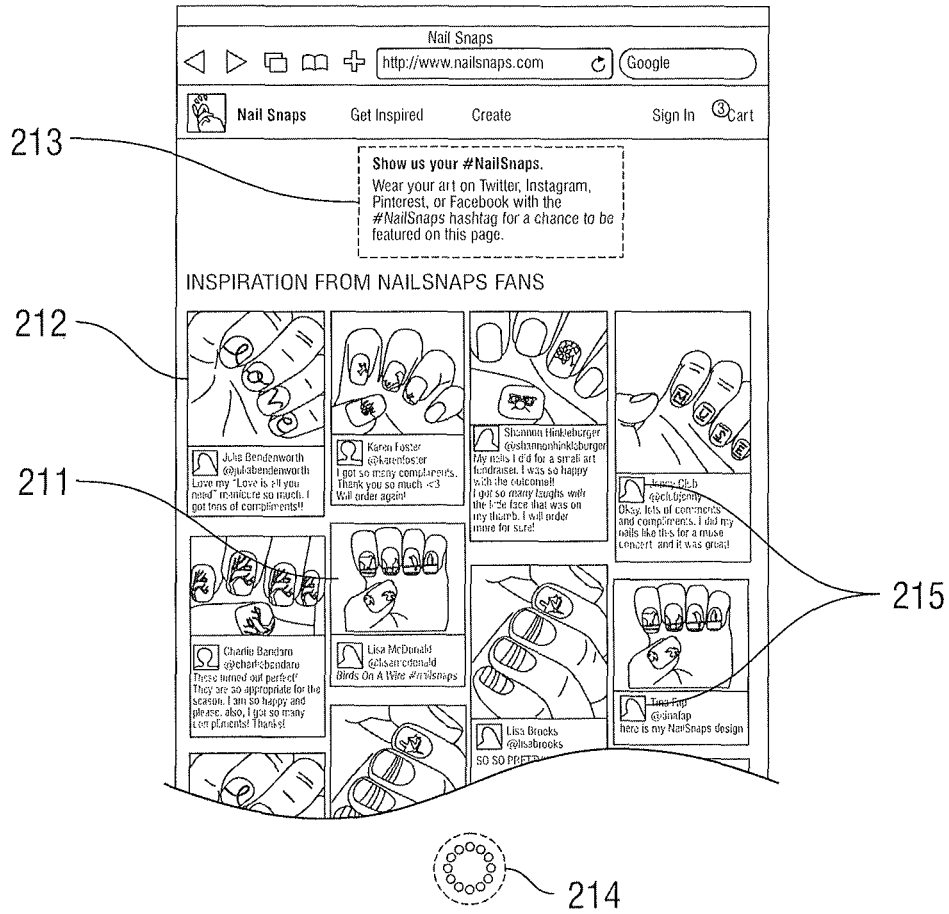
FIG. 21 is an example of an inspiration page of the app according to embodiments of the invention.

In one embodiment of the invention, the app provides "inspiration" or "get inspired" pages. On an inspiration or "get inspired" page FIG. 21, there is provided examples of nail wraps designed according to embodiments of the invention. The page FIG. 21 shows users the kinds of great looking designs they can make with NailSnaps. There are two kinds of content: (1) photo posts to social networks with the #NailSnaps hashtag 211 and (2) newly created looks that users can share as part of the creation process 212. The social posts manually curated from a #NailSnaps hashtag search on Twitter, Instagram, Pinterest, and Facebook. The page FIG. 21 may rely on a social media manager who is able to choose which #nailsnaps hashtagged posts should be displayed.

Figure 30:
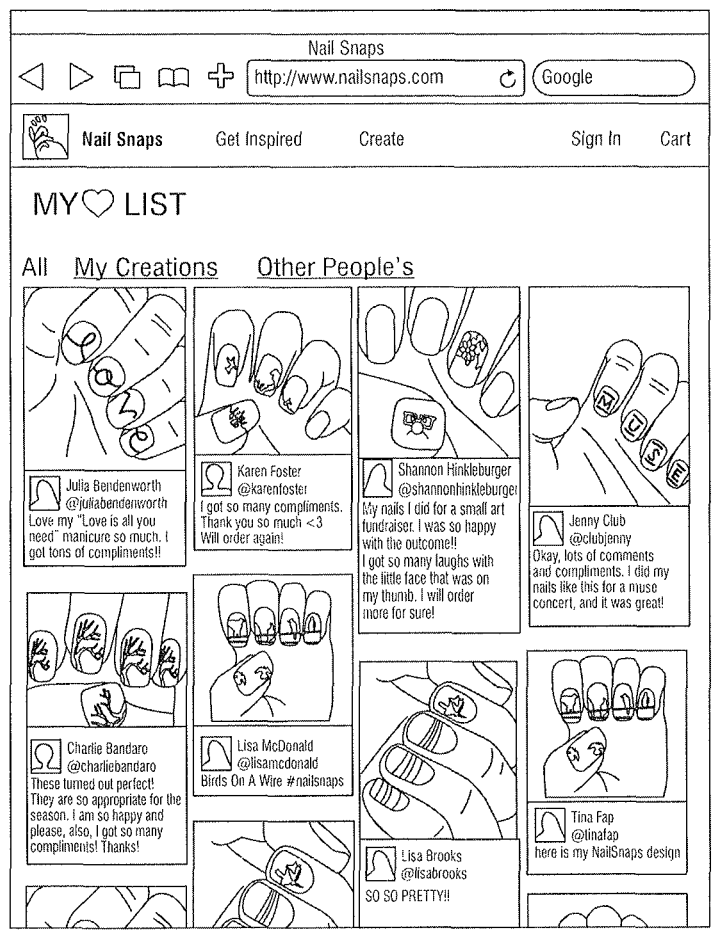
FIG. 30 is an example of a "my heart list" page of the app according to embodiments of the invention.

On an inspiration or "get inspired" page FIG. 21, there are provided share instructions 213, which inform users how they can get their designs to appear on the page. There is also provided inspiration tiles showing nail wraps images from social posts. There is also provided inspiration tiles showing nail wraps images from newly created designs in the app. The tiles are laid out with certain variations based on where they came from. When a user reaches the bottom of the page, additional tiles load 214 so that there is progressive loading of tiles for display. FIG. 30 provides an example of a "my heart list" page of the app according to embodiments of the invention.

Figure 22:
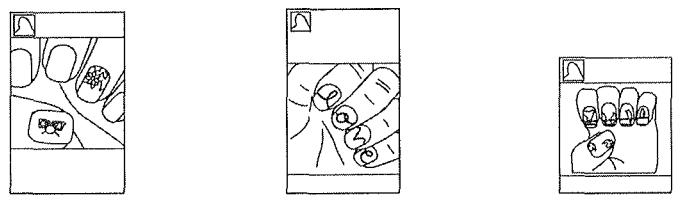
FIG. 22 is an example of various inspiration tiles on an inspiration page of the app according to embodiments of the invention.

On an inspiration or "get inspired" page FIG. 21, the inspiration tiles always contain an image and an avatar of the user who shared the image 215. A user can choose to share images from various sources, including the app or social media platforms such as Facebook, Twitter, Instagram, or Pinterest, and the inspiration tiles are laid out with different variations based on what source the images were shared from FIG. 22. A user may mouse-over an inspiration tile (or tap it if on a touch screens) and then a button appears over the image that lets the user add it to a list of their liked images—a heart list.

Figure 23:
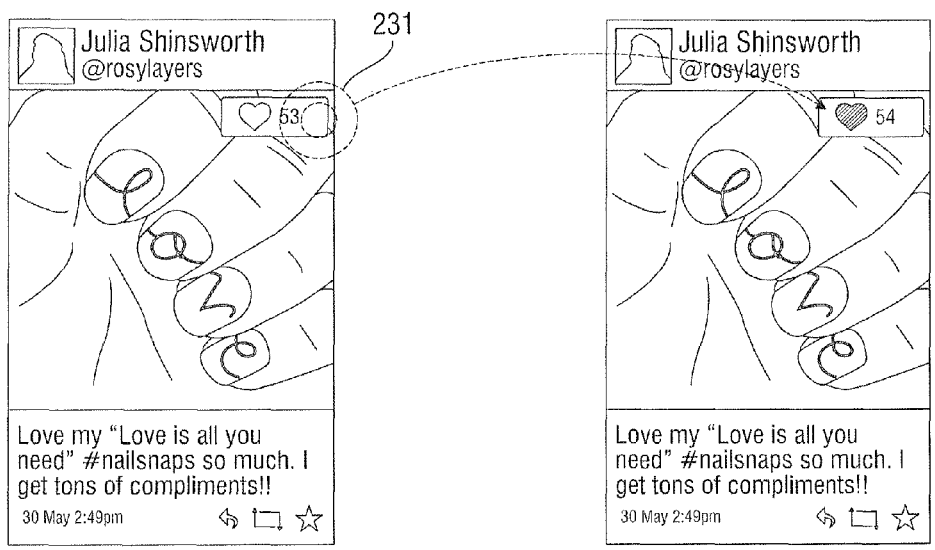
FIG. 23 is an example of various inspiration tiles on an inspiration page of the app according to embodiments of the invention.

FIG. 23 provides an example of the Heart and Share controls that are available for an inspiration tile and that allow a user to like and/or to share the images. A user may tap or click the Heart button 231 to add the design to her heart list—this control stays visible until another image is tapped. A user may double tap on any image to share the post back to the network it came from using that network's standard controls.

Figure 24:
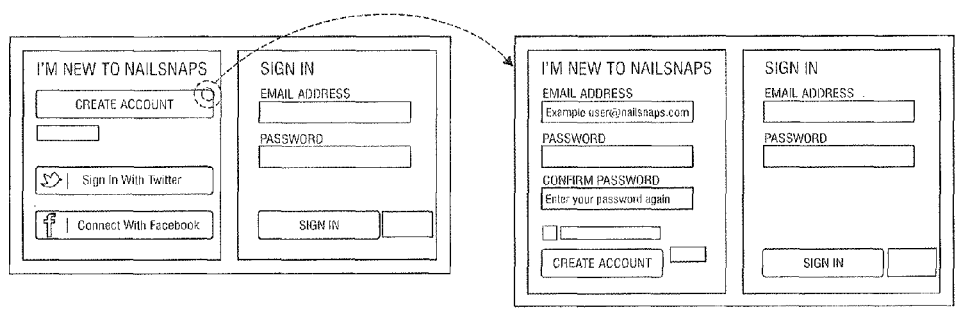
FIG. 24 is an example of a sign-in/register pop-up feature of the app according to embodiments of the invention.
Figure 31:
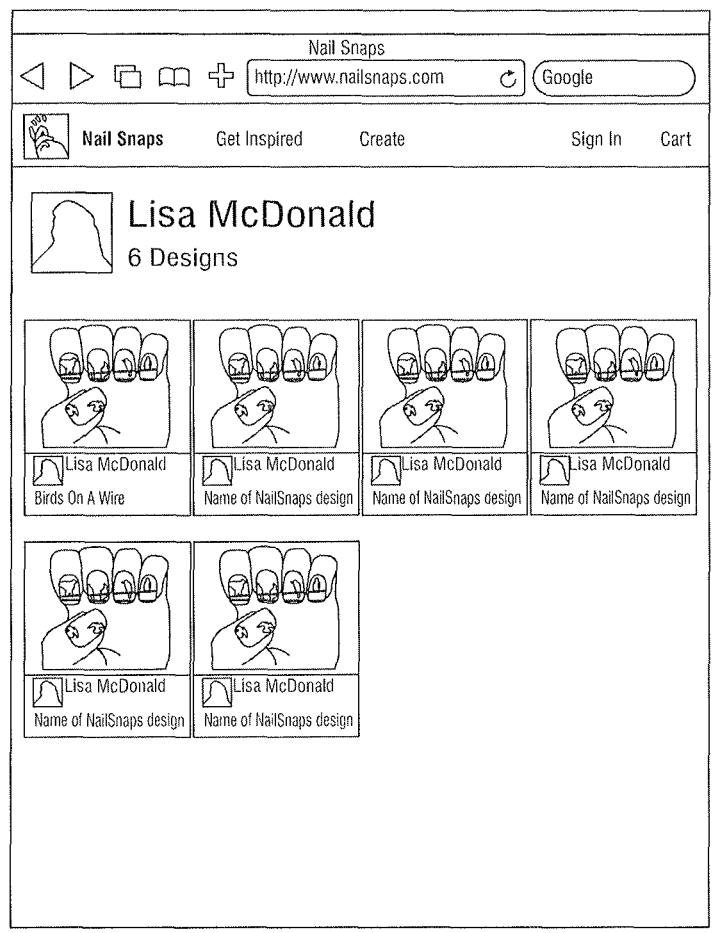
FIG. 31 is an example of a page listing nail snaps designs that are saved to a user account page of the app according to embodiments of the invention.

According to embodiments of the invention, a user may create a User Account. Certain functions on the app may only be performed if the user has an account. If a user tries to do something that requires an account, such as adding a design to her heart list, then a Sign In/Register pop-up FIG. 24 appears. A Sign-In/Register pop-up FIG. 24 is a chromeless overlay that appears anytime a user tries to do something that requires an account: A Sign-In/Register pop-up FIG. 24 allows a user to Tap/Click Sign-In, to add a design to her "heart" list, to save a design, and/or to place an order. FIG. 31 is an example of an user account page where the user has saved various nail snaps designs to her account.

Figure 25:
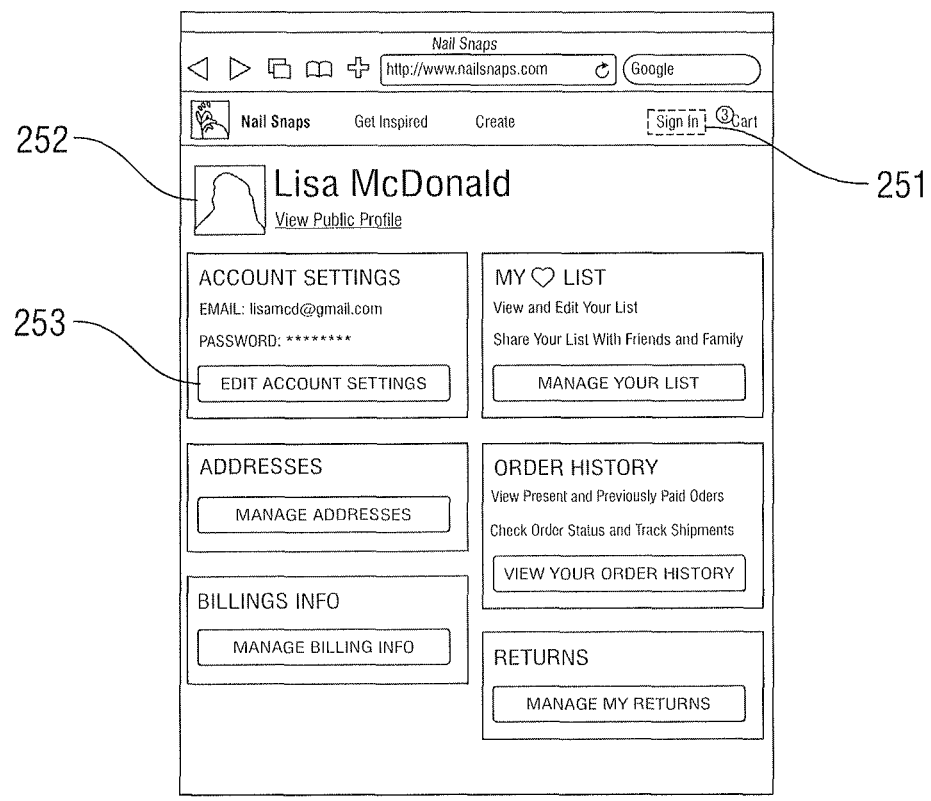
FIG. 25 is an example of an account page of the app according to embodiments of the invention.

After a user creates a user account, if a user signs in using the Sign-In/Register pop-up FIG. 24, then, when the user taps or clicks the Account button or link on the app, a user is taken to an user account page FIG. 25. Before a user with an account signs into her account, the Account button or link that can appear on the app is a "Sign In" button 35, 251 or link instead. For signed-in users, the Sign In link 35, 251 is replaced with a "My Account" button or link, which links to an user account page FIG. 25.

Figures 26, 27:
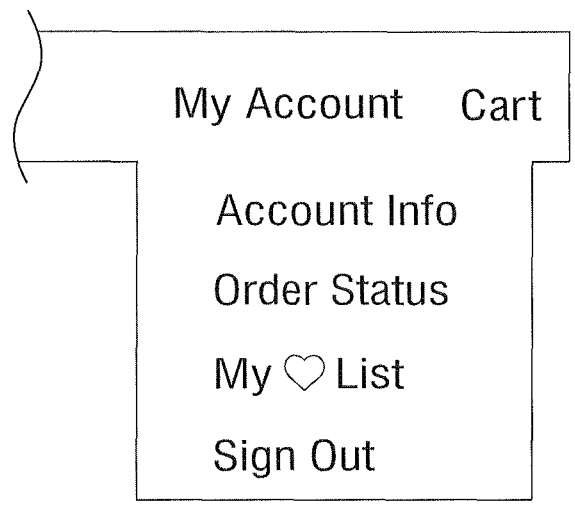
FIG. 26 is an example of a drop down menu of an account page of the app according to embodiments of the invention.
FIG. 27 is an example of a drop down menu of an account page of the app according to embodiments of the invention.

If a user hovers over (or taps on) a "My Account" button or link, a drop-down menu FIG. 26 appears that provides several selections, including "Account Info," which links to an user account page FIG. 25, "Order Status," which opens a user's order status or history, "My Heart List," which opens a user's heart list, "Sign Out," which signs a user out, and "Cart Indicator," which provides a quantity indicator that will appear next to the cart to remind the user about how many items her cart contains if she has added items to her cart. If a user signs in with through a social media platform such as Twitter, Instagram, or Facebook, her name and avatar are pulled from that social media platform. A user can tap or click her avatar image 252 to upload a new image from the user's device. A user may also tap or click her name to make that into an editable field.

In one embodiment of the invention, a user may edit her account settings 253, in which case a window FIG. 27 appears in which a user may edit account information and settings.

Figures 28, 29:
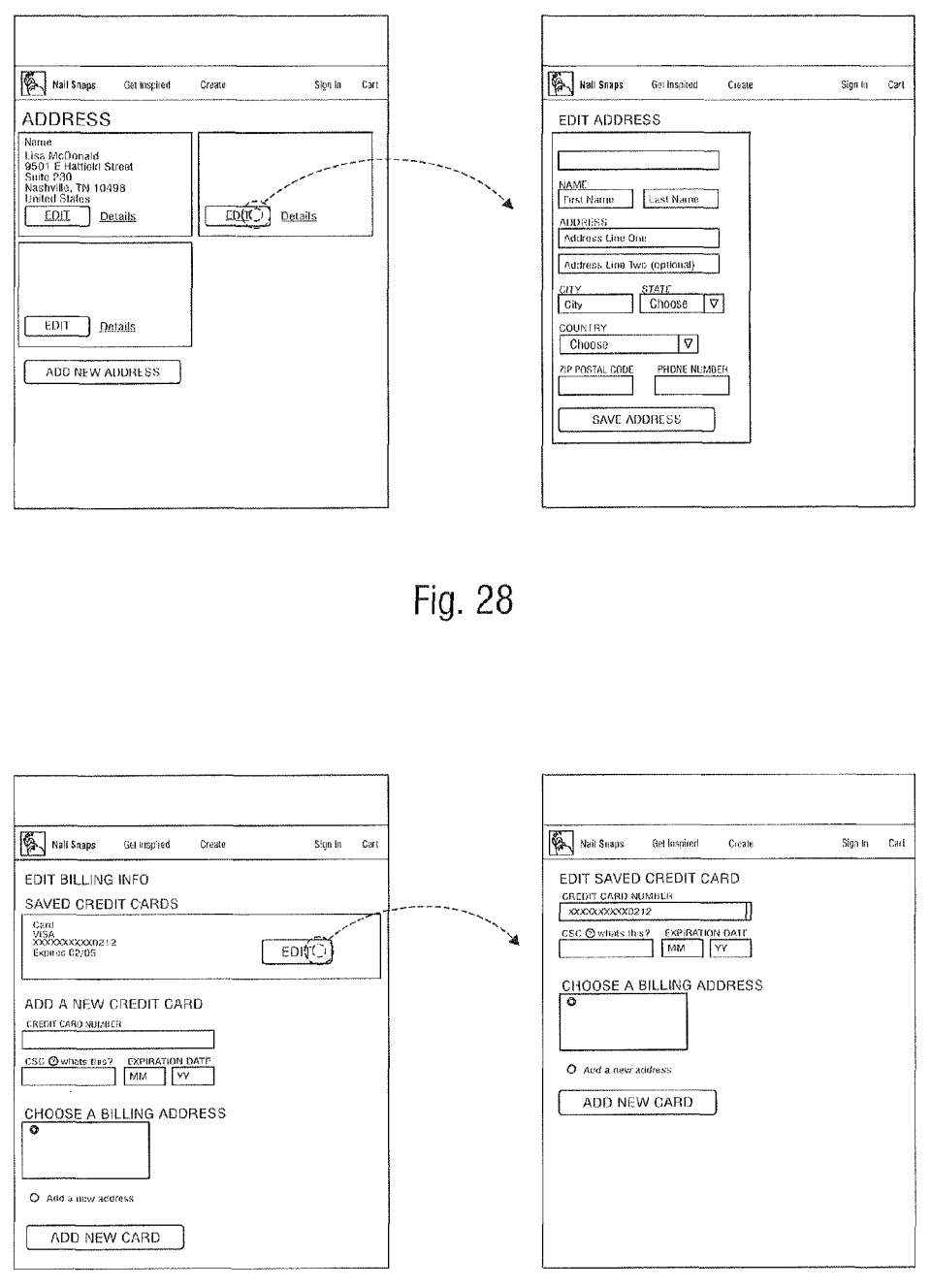
Figure 43:
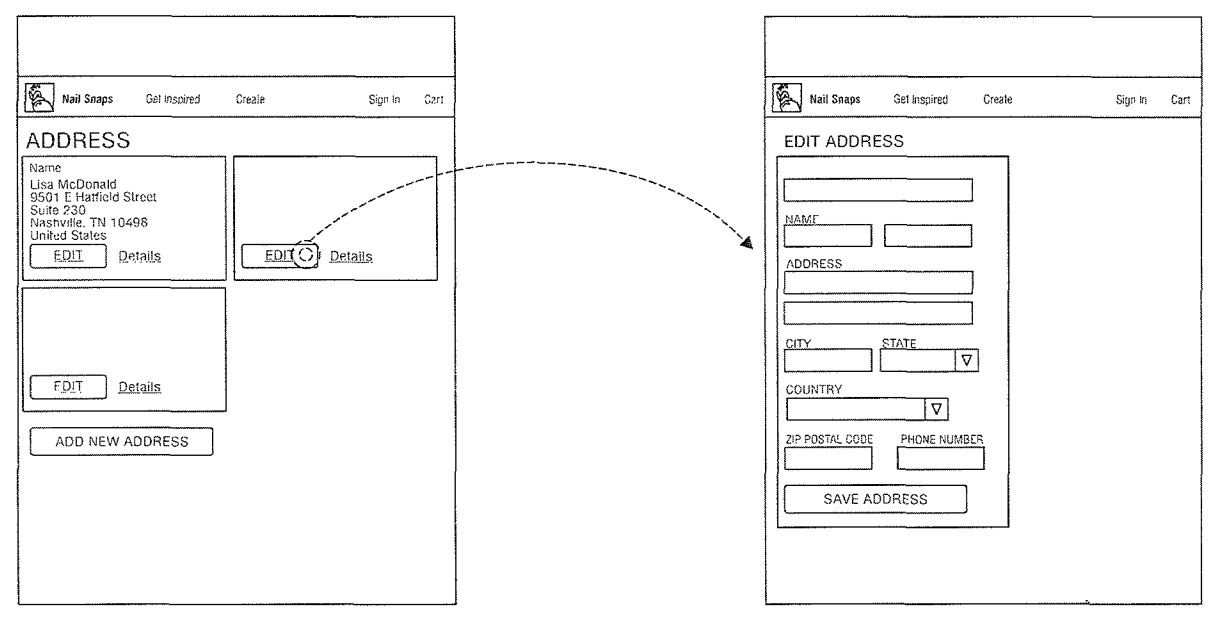

As shown in FIG. 28, FIG. 43, a user may also edit address(es) that may be saved in her account information or add a new address to her account information by selecting an "edit" button or link beside a saved address or by selecting an "add new address" option. Once an address is updated or a new address is created, the "Addresses" page that lists all the saved addresses associated with a user's account re-loads with a message at the top that indicates that the edit or addition was successful.

As shown in FIG. 29, a user may also edit billing information that may be saved in her account information or add new credit card information. A user may also add new credit card information. is an example of "edit billing info" and "edit saved credit card" pages of the app according to embodiments of the invention.

Figure 37A:
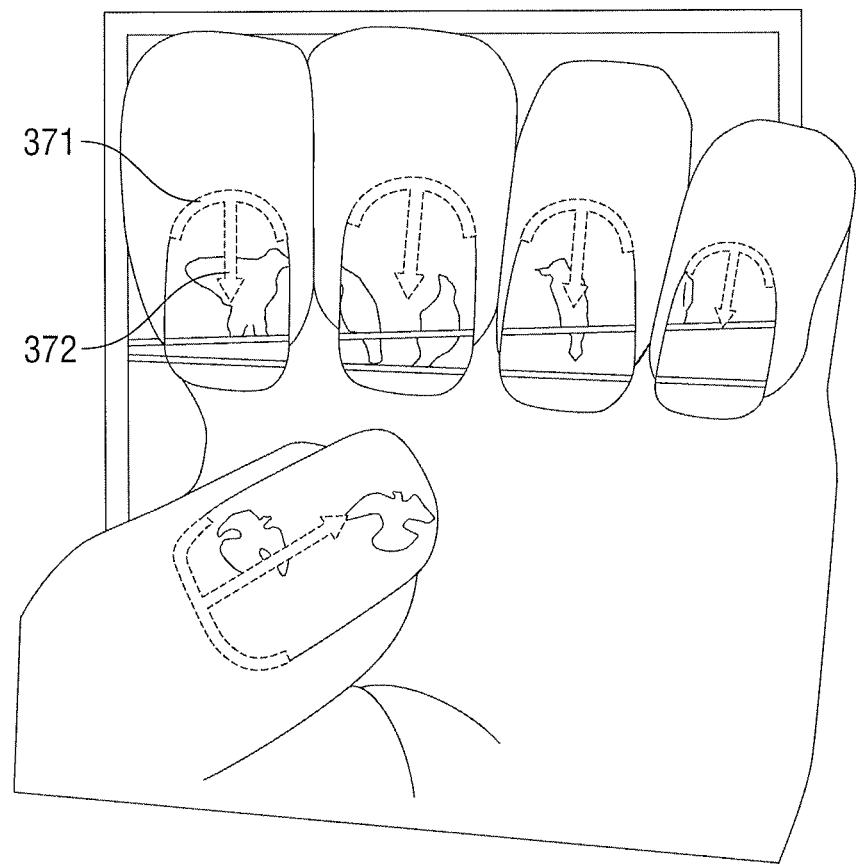
FIG. 37A is an example of image coordinates according to embodiments of the invention.
Figure 37B:
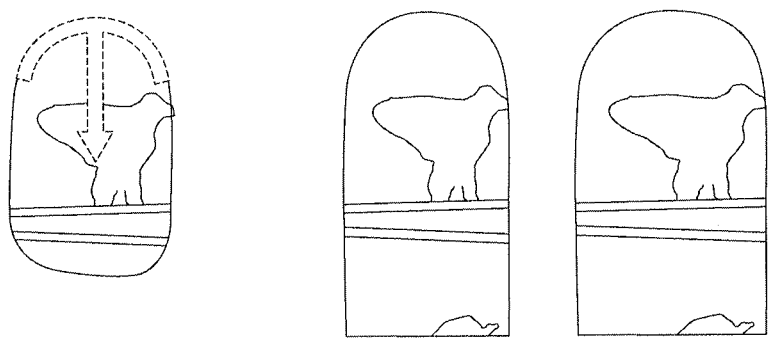
FIG. 37B is an example of image coordinates for a pointer finger and how they will get printed on nail wraps according to embodiments of the invention.

In one embodiment of the invention, there are image coordinates. Image coordinates consist of a cuticle base curve 371 and a directional line 372 as shown in FIG. 37A. The cuticle base curve 371 and the directional line 372 are collectively referred to as image coordinates and they are what get locked or copied to a particular nail. When a nail is locked, the aspect ratio of the image is fixed in relation to the source nail in the hand pose stencil at the time the image was locked. When a nail is copied, the aspect ratio for image coordinates remains consistent to the nail from which it was copied. The fingers on which each set of image coordinates 371, 372 appear determine what will be printed as nail wraps. Each finger's image according to its coordinates 371, 372 are printed as two or more of the available sizes: cat/medium/classic/regular, kitten/small/petite/narrow, or lioness/large/broad, etc. For example, as shown in FIG. 37B, when ordered, an image coordinate for a pointer finger results in two pointer finger nail wrap stickers getting printed, which are shown as Cat and Lioness sized in the depiction.

Figure 38A:
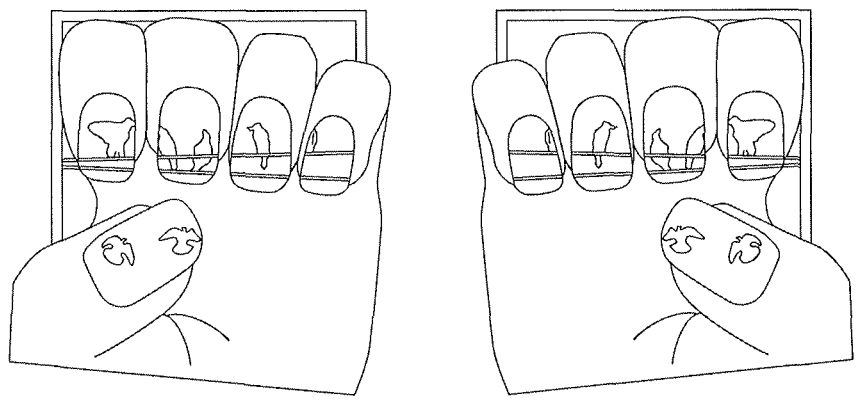
FIG. 38A is an example of a nail wraps design on a finger pose stencil according to embodiments of the invention.
Figure 38B:
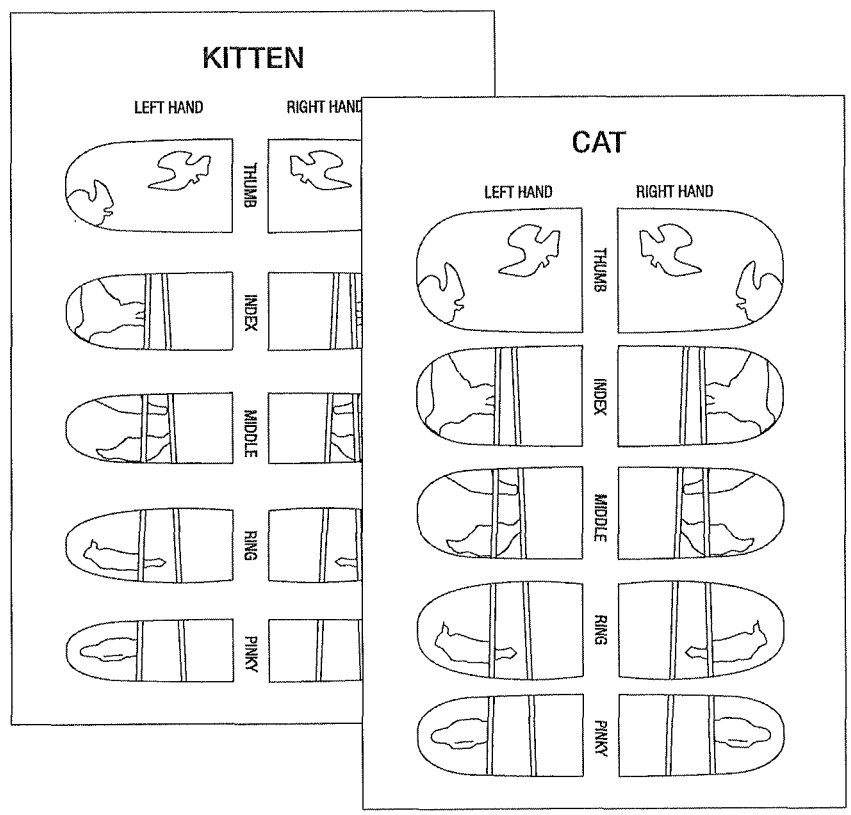
FIG. 38B is an example of a printed nail wraps design according to embodiments of the invention.
Figure 40B:
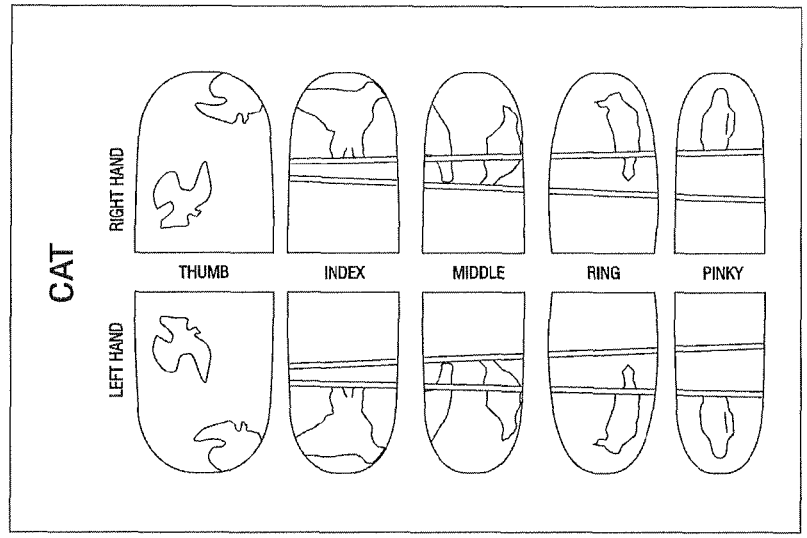
FIG. 40B is an example of a Cat nail wrap size according to embodiments of the invention.
Figure 40A:
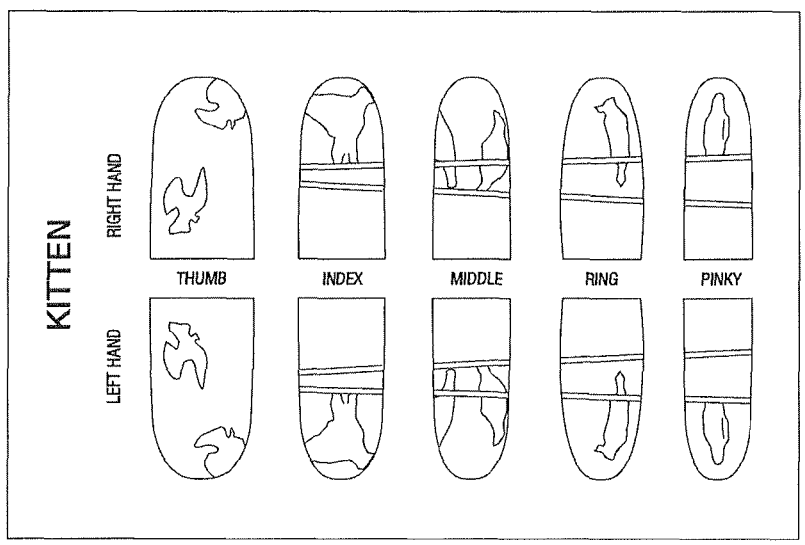
FIG. 40A is an example of a Kitten nail wrap size according to embodiments of the invention.
Figure 40C:
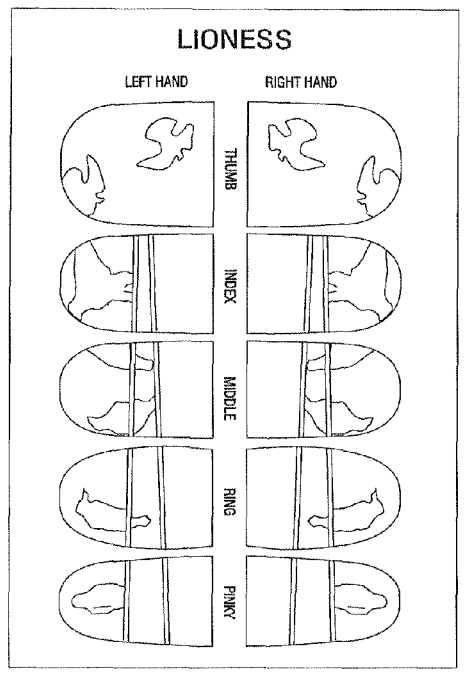
FIG. 40C is an example of a Lioness nail wrap size according to embodiments of the invention.

According to one embodiment of the invention, when a user places an order for a nail snaps design, the user may receive a medium (cat/regular/classic/etc.) size nail wraps pack of 10 for both hands FIG. 40B. The user may also be able to select a second set of 10 nail wraps of a second size—either large (lioness/broad/etc.) FIG. 40C or small (kitten/petite/etc.) FIG. 40B, depending on the user's selection. For example, each of the five fingers of the nail pose stencil is used to create a sticker sheet in two of the three available sizes, doubled because a user has two hands meaning that each order may include 20 nail stickers with two sizes for maximum flexibility of the nail wraps wearer. So ordering a design like that depicted in FIG. 38A results in two sizes (medium and the other size of the customer's choosing) getting printed and shipped as depicted in FIG. 38B.

Figure 39A:
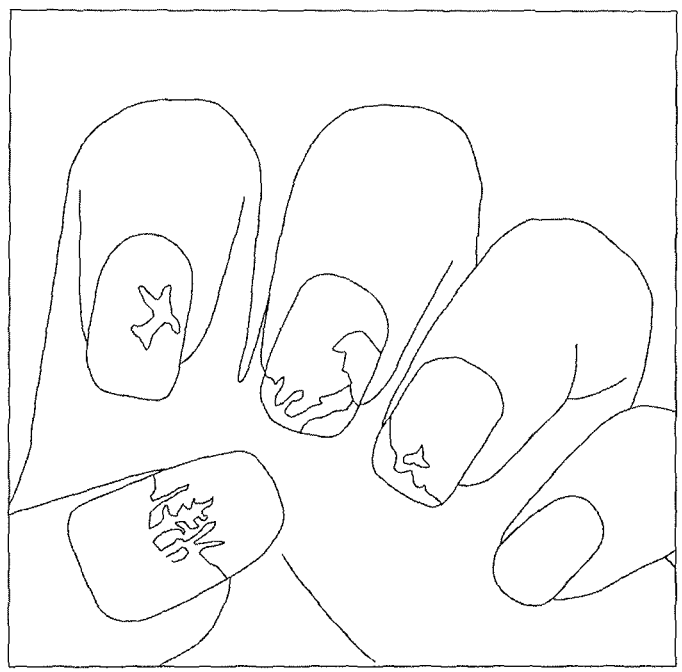
FIG. 39A is an example of a Tiger Claw finger pose or hand pose for a finger pose or hand pose stencil according to embodiments of the invention.
Figure 39B:
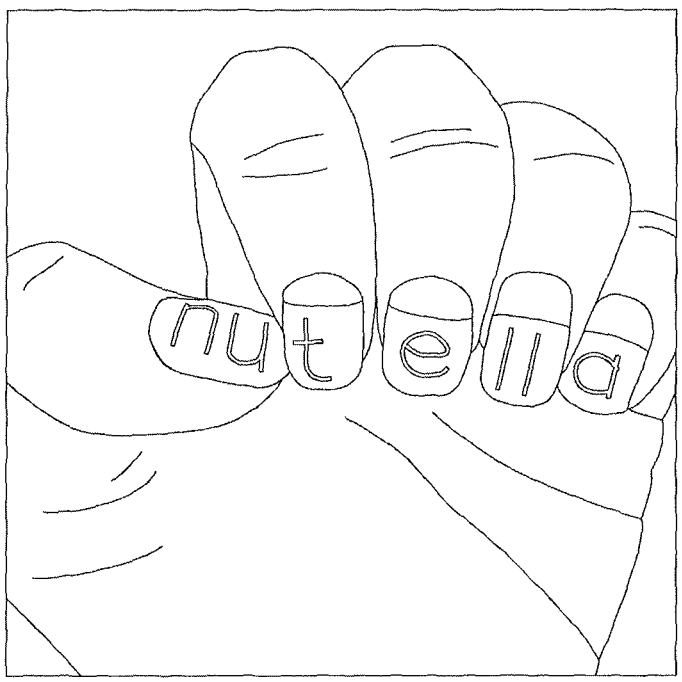
FIG. 39B is an example of a Long View Horizontal finger pose or hand pose for a finger pose or hand pose stencil according to embodiments of the invention.
Figure 39C:
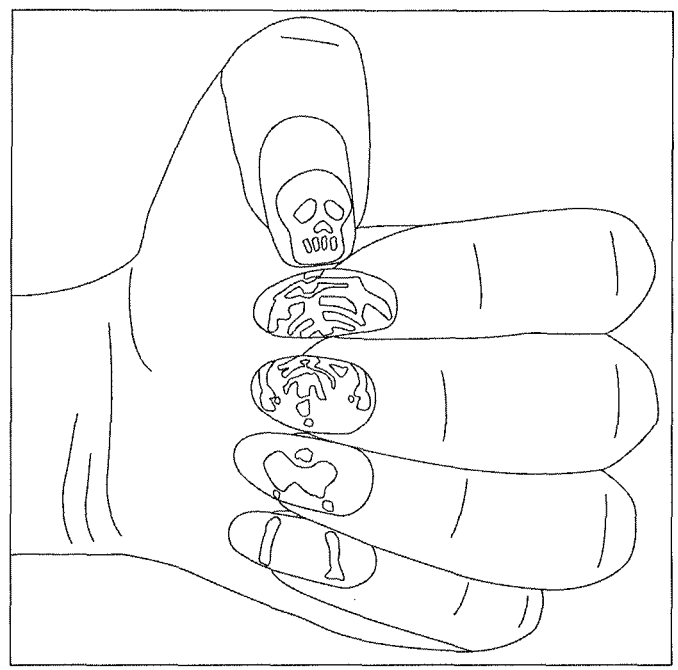
FIG. 39C is an example of a Long View Vertical finger pose or hand pose for a finger pose or hand pose stencil according to embodiments of the invention.
Figure 39D:
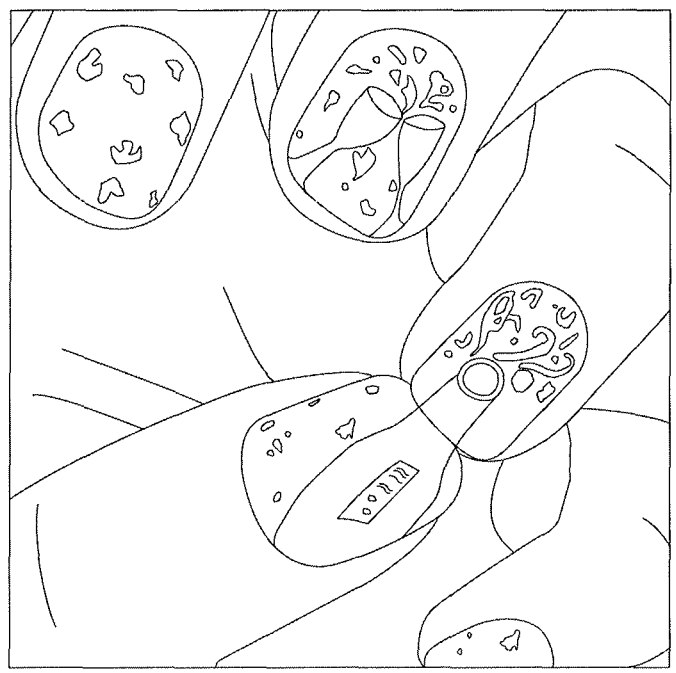
FIG. 39D is an example of a Thumbs Up finger pose or hand pose for a finger pose or hand pose stencil according to embodiments of the invention.
Figure 39E:
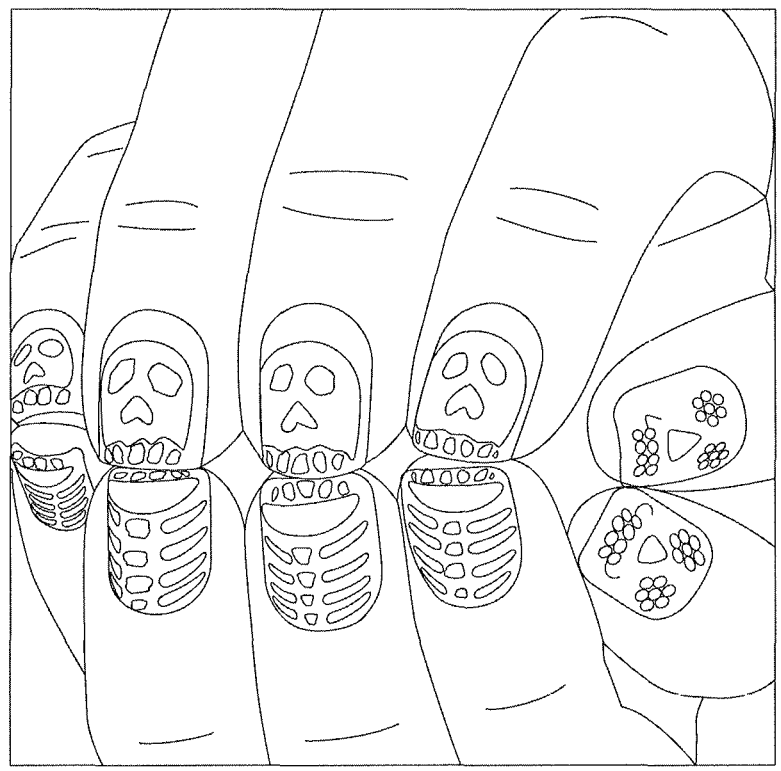
FIG. 39E is an example of a Fly Trap finger pose or hand pose for a finger pose or hand pose stencil according to embodiments of the invention.

In various embodiments of the invention, there are provided different finger pose (interchangeably referred to as "hand pose") stencils with various finger or hand poses. The finger or hand pose stencil includes image coordinates for the fingernails of the finger or hand pose stencil Finger poses for the finger pose stencils include Tiger Claw FIG. 39A, Long View Horizontal FIG. 39B, Long View Vertical FIG. 39C, Thumbs Up FIG. 39D (connecting the thumb to the ring finger for one long element in an image), and Fly Trap FIG. 39E (giving users the largest possible canvas and great for images of people or characters). Additionally, there is a mechanism that creates a custom finger pose stencil based on a photo or live real time scan or image collection of each customer's hand. Alternatively a user may inter measurements of its nails and nail beds to create a custom finger pose stencil.

An embodiment of the invention provides for nail wraps to be printed in three sizes: Kitten (small/petite/etc.) FIG. 40A, Cat (medium/classic/regular/etc.) FIG. 40B, and Lioness (large/broad/etc.) FIG. 40C. Every order may be shipped in a medium size and a user's choice of another size for a total of 20 sticker per order for maximum flexibility of nail sizes. All nail wraps are the same length so the sizing only refers to the width of the nail bed. For narrow nail beds or petite hands, smaller sizes are 85% narrower than medium sizes. For wide nail beds or large, expressive hands, larger sizes are 115% wider than medium sizes.

In one embodiment of the invention, there is an option to share nail snap designs through social media platforms. Whenever a user's gone through the design process, the user is able to share her designs with the world even if she hasn't purchased them. There is also provided a virtual marketplace that lets users sell their creations to other users so that people may purchase their friends' designs and users may get paid for any designs that they sell.

Figure 41:
FIG. 41 is an example of an error message that may appear according to embodiments of the invention.
Figure 42:
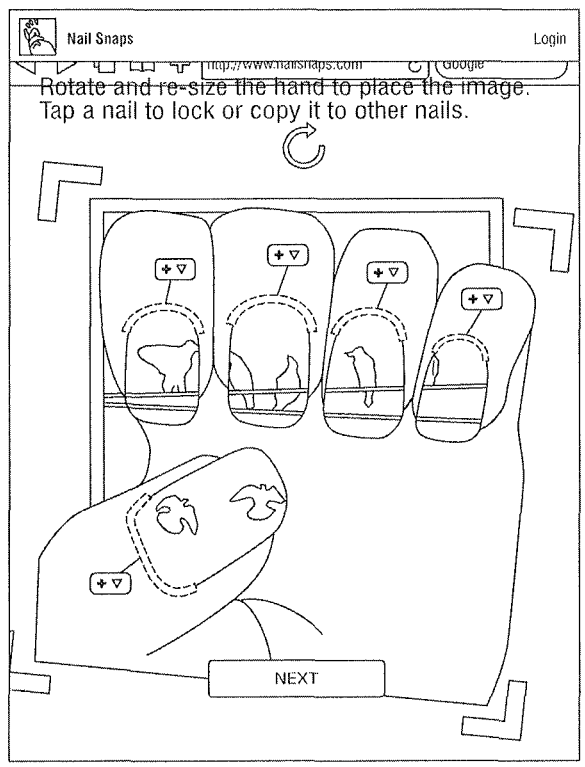
FIG. 42 is an example of one of the creation pages of the app according to embodiments of the invention.

In one embodiment of the invention, if a user skips, forgets to complete, or completes incorrectly a required field an error message may be displayed FIG. 41 so that the user is prompted to complete the field properly.

In one embodiment of the invention, an address validator is also provided. An address validator may be a smart way to avoid common customer typos that might cause shipping problems, ones that otherwise would have resulted in undelivered or delayed orders. An address validator may be used to prevent a user from advancing if she did not input an address that could be validated. The user's address may then be replaced by the validated address. Alternatively, if the address validator detects a difference between the user's entered address and the address validation, then the user may be informed that her typed address doesn't match the address validation and therefore may contain errors. The user then may have the option to proceed anyway, to use the address validation, or to re-type the address.

Figure 45:
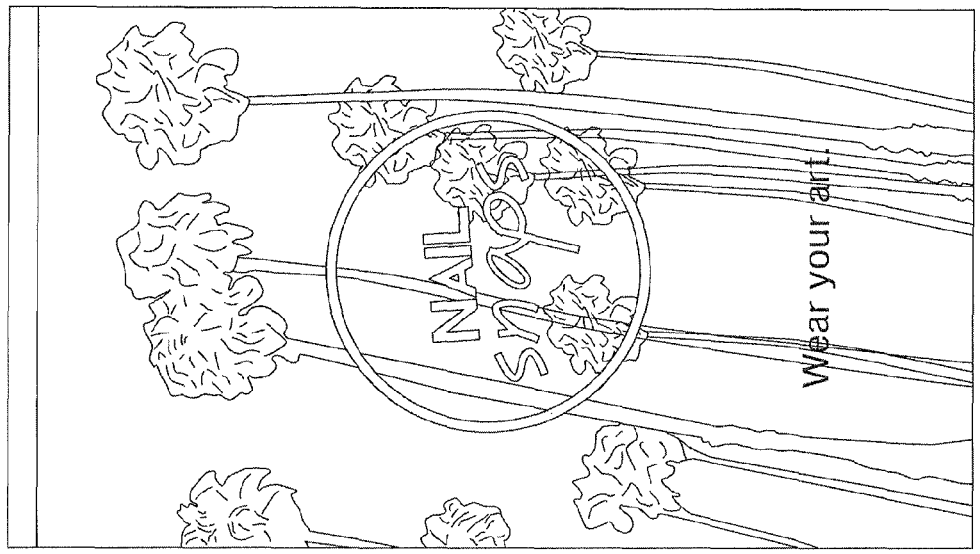
FIG. 45 is an example of a launch page of the app according to embodiments of the invention.
Figure 44:
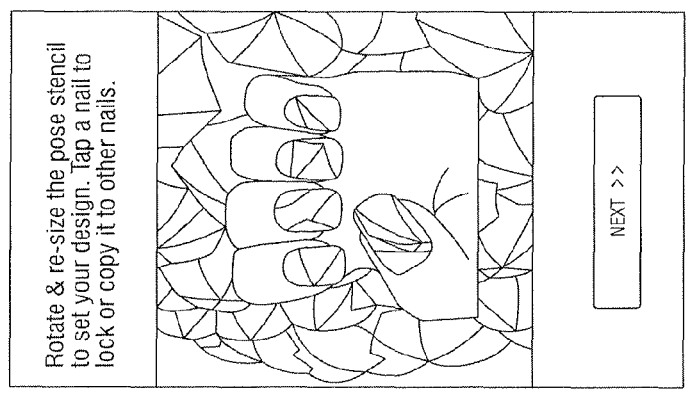
FIG. 44 is an example of one of the creation pages of the app according to embodiments of the invention.

In one embodiment of the invention, there is provided a launch page of the app. After a user is on the launch home page for about 1.5 seconds, the launch page changes to a home page FIG. 3, FIG. 45.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification are approximate, not exact. They are intended to have a reasonable range which is consistent with the functions to which they relate and with what is customary in the art to which they pertain.

All articles, patents, patent applications, and other publications which have been cited are hereby incorporated herein by reference.

The invention claimed is:

1. A processor-based method, comprising:
providing, by a processor of a user computing device, an image file in response to receiving an image input from a user on a user interface of the user computing device;
generating and displaying, by a visual display module of the user computing device, a displayed image representative of the image file;
providing, by the processor, a virtual hand pose stencil representative of a hand pose, wherein virtual hand pose stencil includes a plurality of respective fingernail objects corresponding to respective fingernails of a hand pose image, and wherein the virtual hand pose stencil includes respective image coordinates for each of the respective fingernail objects;
automatically positioning, by the processor, the virtual hand pose stencil over the image file, to associate the respective image coordinates for each of the respective fingernail objects of the virtual hand pose stencil with respective portions of the displayed image on a page generated by the user computing device; and
generating and displaying, by the visual display module of the user computing device, a composite image representative of the hand pose image and the respective portions of the displayed image associated with the respective image coordinates for each of the respective fingernail objects of the virtual hand pose stencil, wherein the composite image includes the respective portions of the displayed image in alignment with the respective fingernails of the hand pose image;

wherein the virtual hand pose stencil is repositionable over the image file in response to receiving a repositioning input from the user on the user interface of the user computing device, to associate at least one of the respective image coordinates for each of the respective fingernail objects of the virtual hand pose stencil with a different portion of the displayed image on an updated page generated by the user computing device, wherein the hand pose image is an opaque hand pose image including transparent fingernails, and wherein the step of generating and displaying the composite image comprises displaying the opaque hand pose image over the displayed image with the respective portions of the displayed image associated with the respective image coordinates in alignment with the transparent fingernails of the hand pose image.

2. The processor-based method of claim 1, further comprising the step, in response to the processor receiving the repositioning input from the user on the user interface of the user computing device, of resizing the virtual hand pose stencil positioned over the image file on the updated page generated by the user computing device.

3. The processor-based method of claim 1, further comprising the step, in response to the processor receiving the repositioning input from the user on the user interface of the user computing device, of rotating the virtual hand pose stencil positioned over the image file on the updated page generated by the user computing device.

4. The processor-based method of claim 1, wherein the visual display module of the user computing device is a touch screen, wherein the step of generating and displaying the composite image includes displaying a visual border for the hand pose image, and wherein the repositioning input from the user on the user interface of the user computing device comprises a multi-touch twist input or a multi-touch stretch input applied on the touch screen to the hand pose image.

5. The processor-based method of claim 1, wherein the step of providing a virtual hand pose stencil representative of a hand pose comprises the selecting the virtual hand pose stencil from a plurality of virtual hand pose stencils stored by the user computing device in response to a hand pose selection input received from a user on the user interface of the user computing device.

6. The processor-based method of claim 1, wherein the virtual hand pose stencil is representative of a tiger claw hand pose.

7. The processor-based method of claim 1, wherein the virtual hand pose stencil is representative of a long view horizontal hand pose.

8. The processor-based method of claim 1, wherein the virtual hand pose stencil is representative of a long view vertical hand pose.

9. The processor-based method of claim 1, wherein the virtual hand pose stencil is representative of a thumbs up hand pose.

10. The processor-based method of claim 1, wherein the virtual hand pose stencil is representative of a fly trap hand pose.

11. The processor-based method of claim 1, wherein the image input from the user is selected from one or more of a user created image, a photograph, an image obtained from an social media website, an image obtained from an application, an image obtained from an image library stored by the memory, or an image obtained from a remote source.

12. A processor-based method, comprising:

providing, by a processor of a user computing device, an image file in response to receiving an image input from a user on a user interface of the user computing device;

generating and displaying, by a visual display module of the user computing device, a displayed image representative of the image file;

providing, by the processor, a virtual hand pose stencil representative of a hand pose, wherein virtual hand pose stencil includes a plurality of respective fingernail objects corresponding to respective fingernails of a hand pose image, and wherein the virtual hand pose stencil includes respective image coordinates for each of the respective fingernail objects;

automatically positioning, by the processor, the virtual hand pose stencil over the image file, to associate the respective image coordinates for each of the respective fingernail objects of the virtual hand pose stencil with respective portions of the displayed image on a page generated by the user computing device; and generating and displaying, by the visual display module of the user computing device, a composite image representative of the hand pose image and the respective portions of the displayed image associated with the respective image coordinates for each of the respective fingernail objects of the virtual hand pose stencil, wherein the composite image includes the respective portions of the displayed image in alignment with the respective fingernails of the hand pose image;

wherein the virtual hand pose stencil is repositionable over the image file in response to receiving a repositioning input from the user on the user interface of the user computing device, to associate at least one of the respective image coordinates for each of the respective fingernail objects of the virtual hand pose stencil with a different portion of the displayed image on an updated page generated by the user computing device; and in response to the processor receiving a lock input from the user on the user interface of the user computing device selecting at least one of the respective fingernail objects, locking at least one of the respective portions of the displayed image associated with the respective image coordinates for the selected at least one of the respective fingernail objects, wherein in the event of the processor receiving the repositioning input from the user on the user interface of the user computing device after receiving the lock input, the at least one of the respective portions of the displayed image remains fixed relative to the at least one of the respective fingernail objects on the updated page generated by the user computing device.

13. A processor-based method, comprising:

providing, by a processor of a user computing device, an image file in response to receiving an image input from a user on a user interface of the user computing device;

generating and displaying, by a visual display module of the user computing device, a displayed image representative of the image file;

providing, by the processor, a virtual hand pose stencil representative of a hand pose, wherein virtual hand pose stencil includes a plurality of respective fingernail objects corresponding to respective fingernails of a hand pose image, and wherein the virtual hand pose stencil includes respective image coordinates for each of the respective fingernail objects;

automatically positioning, by the processor, the virtual hand pose stencil over the image file, to associate the respective image coordinates for each of the respective fingernail objects of the virtual hand pose stencil with respective portions of the displayed image on a page generated by the user computing device; and generating and displaying, by the visual display module of the user computing device, a composite image representative of the hand pose image and the respective portions of the displayed image associated with the respective image coordinates for each of the respective fingernail objects of the virtual hand pose stencil, wherein the composite image includes the respective portions of the displayed image in alignment with the respective fingernails of the hand pose image;

wherein the virtual hand pose stencil is repositionable over the image file in response to receiving a repositioning input from the user on the user interface of the user computing device, to associate at least one of the respective image coordinates for each of the respective fingernail objects of the virtual hand pose stencil with a different portion of the displayed image on an updated page generated by the user computing device, and wherein the respective image coordinates for each of the respective fingernail objects comprise a cuticle base curve and a directional line extending from the cuticle base curve.

14. The processor-based method of claim 13, further comprising the step, in response to the processor receiving a copy input from the user on the user interface of the user computing device selecting a first one of the respective fingernail objects to be copied to at least one other of the respective fingernail objects, of copying the respective portion of the displayed image associated with the respective image coordinates for the selected first one of the respective fingernail objects to the respective image coordinates for the at least one other of the respective fingernail objects.

15. The processor-based method of claim 13, wherein the step of providing a virtual hand pose stencil representative of a hand pose comprises the steps of capturing and storing an image of a user's posed hand including the respective fingernails, and determining the image coordinates for the plurality of respective fingernail objects corresponding to each of the respective fingernails in the stored image of the user's posed hand.

16. The processor-based method of claim 13, wherein the step of providing a virtual hand pose stencil representative of a hand pose comprises the steps of capturing a real time image of a user's posed hand including the respective fingernails, and determining the image coordinates for the plurality of respective fingernail objects corresponding to each of the respective fingernails in the real time image of the user's posed hand.

17. A processor-based method, comprising:
providing, by a processor of a user computing device, an image file in response to receiving an image input from a user on a user interface of the user computing device;
generating and displaying, by a visual display module of the user computing device, a displayed image representative of the image file;
providing, by the processor, a virtual hand pose stencil representative of a hand pose, wherein virtual hand pose stencil includes a plurality of respective fingernail objects corresponding to respective fingernails of a hand pose image, and wherein the virtual hand pose stencil includes respective image coordinates for each of the respective fingernail objects;
automatically positioning, by the processor, the virtual hand pose stencil over the image file, to associate the respective image coordinates for each of the respective fingernail objects of the virtual hand pose stencil with respective portions of the displayed image on a page generated by the user computing device; and generating and displaying, by the visual display module of the user computing device, a composite image representative of the hand pose image and the respective portions of the displayed image associated with the respective image coordinates for each of the respective fingernail objects of the virtual hand pose stencil, wherein the composite image includes the respective portions of the displayed image in alignment with the respective fingernails of the hand pose image;

wherein the virtual hand pose stencil is repositionable over the image file in response to receiving a repositioning input from the user on the user interface of the user computing device, to associate at least one of the respective image coordinates for each of the respective fingernail objects of the virtual hand pose stencil with a different portion of the displayed image on an updated page generated by the user computing device; and transmitting, by the processor of the user computing device, to a remote server computer system for a computer controlled printer, a nail wrap design file including the respective portions of the displayed image associated with the respective image coordinates for each the plurality of the respective fingernail objects of the virtual hand pose stencil;

wherein the remote server computer system generates from the nail wrap design file a printer file configured to communicate to the computer controlled printer instructions for printing a user nail wrap design onto a nail wrap material in accordance with the respective portions of the displayed image associated with the respective image coordinates for each of the respective fingernail objects of the virtual hand pose stencil.

18. The processor-based method of claim 17, wherein the respective image coordinates for each of the respective fingernail objects comprise a cuticle base curve and a directional line extending from the cuticle base curve.

19. The processor-based method of claim 18, wherein the transmitting step further comprises transmitting to the remote server computer system a user-selected width of the user nail wrap design to be printed onto the nail wrap material, and wherein in the printer file each of the respective portions of the displayed image associated with the respective image coordinates for the each of the respective fingernail objects has a width based upon the user-selected width relative to the cuticle base curve of the respective image coordinates.

20. A system, comprising:
a visual display module;
a user interface;
a memory, configured to store a plurality of image files and a virtual hand pose stencil, wherein the virtual hand pose stencil includes a plurality of respective fingernail objects corresponding to respective fingernails of a hand pose image, and wherein the virtual hand pose stencil includes respective image coordinates for each of the respective fingernail objects;
a processor in communication with the memory, the user interface, and the visual display module, wherein the processor executes a set of instructions instructing the processor to
provide an image file in response to an image input received from a user on the user interface;

generate and display by the visual display module a displayed image representative of the image file;

automatically position the virtual hand pose stencil over the image file to associate the respective image coordinates for each of the respective fingernail objects of the virtual hand pose stencil with respective portions of the displayed image on a page generated by the processor;

in the event the processor receives a repositioning input from the user on the user interface, reposition the virtual hand pose stencil over the image file to associate at least one of the respective image coordinates for each of the respective fingernail objects of the virtual hand pose stencil with a different portion of the displayed image on an updated page generated by the processor; and generate and display by the visual display module a composite image representative of the hand pose image and the respective portions of the displayed image associated with the respective image coordinates for each of the respective fingernail objects of the virtual hand pose stencil, wherein the composite image includes the respective portions of the displayed image in alignment with the respective fingernails of the hand pose image, wherein the respective image coordinates for the each of the respective fingernail objects comprise a cuticle base curve and a directional line extending from the cuticle base curve.

21. The system of claim 20, wherein the instruction, in the event the processor receives a repositioning input from the user on the user interface, to reposition the virtual hand pose stencil over the image file, comprises an instruction to resize the virtual hand pose stencil positioned over the image file on the updated page generated by the processor.

22. The system of claim 20, wherein the instruction, in the event the processor receives a repositioning input from the user on the user interface, to reposition the virtual hand pose stencil over the image file, comprises an instruction to rotate the virtual hand pose stencil positioned over the image file on the updated page generated by the processor.

23. The system of claim 20, wherein the visual display module is a touch screen, wherein the instruction to generate and display the composite image includes an instruction to display a visual border for the hand pose image, and wherein the repositioning input from the user on the user interface comprises a multi-touch twist input or a multi-touch stretch input applied on the touch screen to the hand pose image.

24. The system of claim 20, wherein the image input selects the image file from one or more of a user created image, a photograph, an image obtained from social media website, an image obtained from an application, an image obtained from an image library stored by the memory, or an image obtained from a remote source.

25. A system, comprising:
a visual display module;
a user interface;
a memory, configured to store a plurality of image files and a virtual hand pose stencil, wherein the virtual hand pose stencil includes a plurality of respective fingernail objects corresponding to respective fingernails of a hand pose image, and wherein the virtual hand pose stencil includes respective image coordinates for each of the respective fingernail objects;

a processor in communication with the memory, the user interface, and the visual display module, wherein the processor executes a set of instructions instructing the processor to provide an image file in response to an image input received from a user on the user interface;

generate and display by the visual display module a displayed image representative of the image file;

automatically position the virtual hand pose stencil over the image file to associate the respective image coordinates for each of the respective fingernail objects of the virtual hand pose stencil with respective portions of the displayed image on a page generated by the processor;

in the event the processor receives a repositioning input from the user on the user interface, reposition the virtual hand pose stencil over the image file to associate at least one of the respective image coordinates for each of the respective fingernail objects of the virtual hand pose stencil with a different portion of the displayed image on an updated page generated by the processor; and generate and display by the visual display module a composite image representative of the hand pose image and the respective portions of the displayed image associated with the respective image coordinates for each of the respective fingernail objects of the virtual hand pose stencil, wherein the composite image includes the respective portions of the displayed image in alignment with the respective fingernails of the hand pose image;

a remote server computer system for a computer controlled printer, wherein the set of instructions further instructs the processor to transmit to the remote server computer system a nail wrap design file including the respective portions of the displayed image associated with the respective image coordinates for each of the respective fingernail objects of the virtual hand pose stencil, and wherein the remote server computer system is configured to generate from the nail wrap design file a printer file configured to communicate to the computer controlled printer instructions for printing a user nail wrap design onto a nail wrap material in accordance with the respective portions of the displayed image associated with the respective image coordinates for each of the respective fingernail objects of the virtual hand pose stencil, wherein the respective image coordinates for the each of the respective fingernail objects comprise a cuticle base curve and a directional line extending from the cuticle base curve.

26. A server-based method, comprising:
receiving, from a remote user device, a nail wrap design file including respective portions of a user-selected image file associated with a virtual hand pose stencil, wherein the virtual hand pose stencil is representative of a hand pose; wherein the virtual hand pose stencil includes a plurality of respective fingernail objects corresponding to respective fingernails of a hand pose image; wherein the virtual hand pose stencil includes the respective image coordinates for each of the respective fingernail objects; and wherein in the nail wrap design file, the virtual hand pose stencil associates the respective image coordinates for each of the respective fingernail objects of the virtual hand pose stencil with respective portions of the user-selected image file; and generating, from the nail wrap design file, a printer file configured to communicate to a computer controlled printer instructions for printing a user nail wrap design onto a nail wrap material in accordance with the respective portions of the user-selected image file associated with the respective image coordinates for each of the respective fingernail objects of the virtual hand pose stencil, wherein the respective image coordinates for each of the respective fingernail objects comprise a cuticle base curve and a directional line extending from the cuticle base curve.

27. The server-based method of claim 26, wherein the receiving step further comprises receiving from the remote user device a user-selected width of the user nail wrap design to be printed onto the nail wrap design material, wherein in the printer file each of the respective portions of the user-selected image file associated with the respective image coordinates for the each of the respective fingernail objects has a width based upon the user-selected width relative to the cuticle base curve of the respective image coordinates.

28. The server-based method of claim 26, wherein the receiving step further comprises receiving from the remote user device a user-selected size of the user nail wrap design to be printed onto the nail wrap design material, wherein in the printer file each of the respective portions of the user-selected image file associated with the respective image coordinates for the each of the respective fingernail objects has a size based upon the user-selected size relative to the respective image coordinates.

29. A processor-based method, comprising:
providing, by a processor of a user computing device, an image file in response to receiving an image input from a user on a user interface of the user computing device;
generating and displaying, by a visual display module of the user computing device, a displayed image representative of the image file;
providing, by the processor, a virtual hand pose stencil representative of a hand pose, wherein virtual hand pose stencil includes a plurality of respective fingernail objects corresponding to respective fingernails of a hand pose image, and wherein the virtual hand pose stencil includes respective image coordinates for each of the respective fingernail objects, wherein the respective image coordinates for the each of the respective fingernail objects comprise a cuticle base curve and a directional line extending from the cuticle base curve;
automatically positioning, by the processor, the virtual hand pose stencil over the image file, to associate the respective image coordinates for each of the respective fingernail objects of the virtual hand pose stencil with respective portions of the displayed image on a page generated by the user computing device;
generating and displaying, by the visual display module of the user computing device, a composite image representative of the hand pose image and the respective portions of the displayed image associated with the respective image coordinates for each of the respective fingernail objects of the virtual hand pose stencil, wherein the composite image includes the respective portions of the displayed image in alignment with the respective fingernails of the hand pose image; and
transmitting to a remote computer system for a computer controlled printer, a nail wrap design file including the respective portions of the displayed image associated with the respective image coordinates for each the plurality of the respective fingernail objects of the virtual hand pose stencil.

30. The processor based method of claim 29, further comprising the step of repositioning, by the processor, the virtual hand pose stencil over the image file in response to receiving a repositioning input from the user on the user interface of the user computing device, to associate at least one of the respective image coordinates for each of the respective fingernail objects of the virtual hand pose stencil with a different portion of the displayed image on an updated page generated by the user computing device.

31. The processor-based method of claim 30, wherein the step of repositioning the virtual hand pose stencil over the image file comprises resizing the virtual hand pose stencil positioned over the image file on the updated page generated by the user computing device.

32. The processor-based method of claim 30, wherein the step of repositioning the virtual hand pose stencil over the image file comprises rotating the virtual hand pose stencil positioned over the image file on the updated page generated by the user computing device.

33. The processor-based method of claim 29, wherein the remote computer system generates from the nail wrap design file a printer file configured to communicate to the computer controlled printer instructions for printing a user nail wrap design onto a nail wrap material in accordance with the respective portions of the displayed image associated with the respective image coordinates for each of the respective fingernail objects of the virtual hand pose stencil.

34. The processor-based method of claim 29, wherein the transmitting step further comprises transmitting to the remote computer system a user-selected size of the user nail wrap design to be printed onto the nail wrap material, and wherein in the printer file each of the respective portions of the displayed image associated with the respective image coordinates for the each of the respective fingernail objects has a size based upon the user-selected size relative to the respective image coordinates.

* * * * *